United States Patent
Yoo et al.

(10) Patent No.: US 9,529,194 B2
(45) Date of Patent: Dec. 27, 2016

(54) HEAD-MOUNTED DISPLAY APPARATUS

(71) Applicant: Samsung Electronics Co., Ltd., Gyeonggi-do (KR)

(72) Inventors: Chungkeun Yoo, Gyeonggi-do (KR); Jonghae Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/539,264

(22) Filed: Nov. 12, 2014

(65) Prior Publication Data
US 2015/0138645 A1    May 21, 2015

(30) Foreign Application Priority Data
Nov. 21, 2013 (KR) .................. 10-2013-0142423
Aug. 26, 2014 (KR) .................. 10-2014-0111371

(51) Int. Cl.
*G02B 27/14* (2006.01)
*G02B 27/01* (2006.01)

(52) U.S. Cl.
CPC ....... *G02B 27/0149* (2013.01); *G02B 27/0101* (2013.01); *G02B 2027/0127* (2013.01)

(58) Field of Classification Search
USPC ................................. 359/630–635
See application file for complete search history.

(56) References Cited

U.S. PATENT DOCUMENTS

| | | | |
|---|---|---|---|
| 5,488,510 A | 1/1996 | LeMay | |
| 6,421,031 B1 * | 7/2002 | Ronzani | G02B 27/017 345/8 |
| 8,482,527 B1 | 7/2013 | Kim | |
| 2007/0243863 A1 | 10/2007 | Hong et al. | |
| 2008/0144264 A1 | 6/2008 | Cosgrove | |
| 2010/0079356 A1 * | 4/2010 | Hoellwarth | G02B 27/017 345/8 |
| 2012/0212399 A1 | 8/2012 | Border et al. | |
| 2013/0194682 A1 | 8/2013 | Sahu | |
| 2014/0362110 A1 * | 12/2014 | Stafford | G06F 3/013 345/633 |

FOREIGN PATENT DOCUMENTS

| | | |
|---|---|---|
| GB | 2499102 A | 8/2013 |
| JP | 7-30928 A | 1/1995 |
| JP | 7-318850 A | 12/1995 |
| JP | 8-111878 A | 4/1996 |

OTHER PUBLICATIONS

Korean Intellectual Property Office Notification of Preliminary Rejection dated Feb. 17, 2016.

* cited by examiner

*Primary Examiner* — Mohammed Hasan
(74) *Attorney, Agent, or Firm* — Cha & Reiter, LLC

(57) ABSTRACT

A head-mounted display apparatus including a face plate having a first surface formed to face a user's face, and a support part configured to be coupled with at least a part of the face plate so as to allow the face plate to be fixed on the user's face. A cavity structure may be formed on second surface of the face plate which is opposite to the first surface so as to mount an external electronic device to the head mounted display apparatus. One or more position adjustment units are configured to adjust a position of the external electronic device and may be formed on at least one side surface of the face plate.

28 Claims, 16 Drawing Sheets

HEAD-MOUNTED DISPLAY APPARATUS

CLAIM OF PRIORITY

This application claims priority from and the benefit under 35 U.S.C. §119(a) of Korean Patent Application No. 10-2013-0142423, filed on Nov. 21, 2013 and No. 10-2014-0111371, Aug. 26, 2014 which are hereby incorporated by reference in its entirety for all purposes as if fully set forth herein.

BACKGROUND

1. Field of the Disclosure

Various exemplary embodiments of the present disclosure relate to a head-mounted display apparatus.

2. Description of the Prior Art

In general, a Head-Mounted Display (HMD) apparatus may be mounted on a body portion, for example, a human head, in order to provide a hands free display of an image. Such a HMD apparatus may be formed, for example, in a shape of goggles or spectacles.

For example, HMD apparatus may include a display configured to output an image and positioned on the head where the display faces a user's eyes. Further, the HMD may further include lenses configured to be capable of correcting the user's eyesight in which the lenses are positioned between the user's eyes and the display.

According to related art, the HMD apparatus may provide an image according to the user's eyesight by moving the lenses positioned between the display and the user's pupils according to the user's eyesight or by replacing the lenses to be suitable for the user's eyesight. In the case of the HMD apparatus in which the position of the lenses are moved according to the user's eyesight, a height of a lens barrel configured to support the lenses should be adjusted so as to adjust the distance of the lenses. In such a case, lens barrels having different heights according to users' sights are needed and a lens barrel for each user should be separately fabricated.

In the case of the HMD apparatus configured to adjust a lens distance, when the lenses are moved toward the display, the area of the display to be viewed by the user is relatively reduced such that the user's sense of immersion may be reduced. On the contrary, when the lenses are moved toward the user's pupils, the distance from the final surface of an optical system to the user's pupils (for example, eye relief) get closer to each other such that the surface may come in contact with the user's eye lashes. As a result, the wearing of the HMD apparatus may become uncomfortable. In addition, in the case of the HMD apparatus configured to replace the lenses, the lenses should be newly replaced according to the user's sight.

SUMMARY

Various exemplary embodiments of the present disclosure may provide a head-mounted display (HMD) apparatus which is capable of providing an image according to a user's sight by adjusting a display without adjusting a lens distance of the HMD or by replacing lenses.

According to various embodiments of the present disclosure, a HMD apparatus may include a face plate having one (a first) surface formed to face (i.e. to be oriented toward) a user's face, and a support part configured to be coupled with at least a part of the face plate so as to allow the face plate to be fixed on the user's face. A cavity structure may be formed on another (a second) surface of the face plate which is opposite to the one surface so as to mount an external electronic device, and one or more position adjustment units configured to adjust a position of the external electronic device may be formed on at least one side surface of the face plate.

According to various embodiments of the present disclosure, a HMD apparatus may include: a face plate having a first surface formed to face a user's face; and a support part configured to couple with at least a portion of the face plate to allow the face plate to be fixed on the user's face. The face plate may include, on at least a first surface thereof, a display configured to output an image, and one or more position adjustment units configured to adjust a position of the external electronic device are formed on at least the first side surface of the face plate.

An HMD according to an exemplary embodiment may move a display so as to reflect, for example, a user's eyesight which may improve the user's wearability and screen commitment level. According to various exemplary embodiments, the HMD apparatus is provided with a device configured to correct image-blurring on the display which may be caused due to a difference in eyesight between users. Thus, the HMD apparatus may be configured to be used generally without providing a specific head mount structure for each user. Further, according to an exemplary embodiment, the display may be moved horizontally with reference to, for example, a lens. Thus, the user may less feel dizziness while adjusting a focus according to the user's eyesight.

BRIEF DESCRIPTION OF THE DRAWINGS

The above features and advantages of the present invention will become more apparent to a person of ordinary skill in the art from the following detailed description in conjunction with the accompanying drawings, in which.

DETAILED DESCRIPTION

Figure 1:
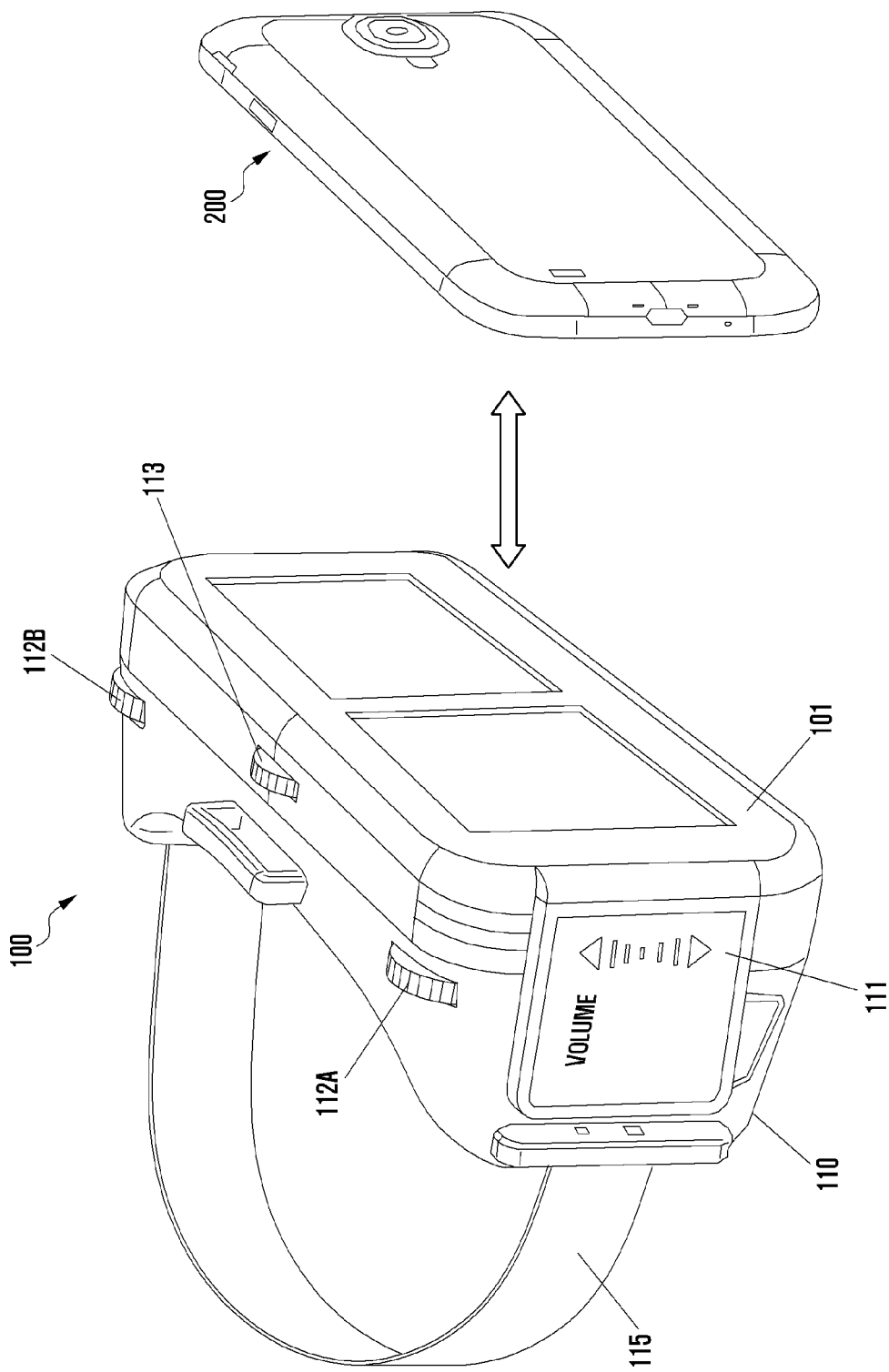
FIG. 1 is a perspective view illustrating an HMD apparatus according to various embodiments of the present disclosure.

Hereinafter, various embodiments of the present disclosure will be described in detail with reference to the accompanying drawings. It should be noted that the same elements will be designated by the same reference numerals although they are shown in different drawings. Further, a detailed description of known functions and configurations may be omitted when their inclusion may obscure appreciation by a person of ordinary skill in the art of the subject matter of the present disclosure with a detailed discussion of such known functions and configurations. FIG. 1 is a perspective view illustrating a head-mounted display (HMD) apparatus 100 according to various embodiments of the present disclosure.

In FIG. 1, the head-mounted display apparatus 100 may include a face plate 110 and a support part 115 (e.g., goggle band). The face plate 110 may be arranged over a part of a user's of face (e.g., front side). The face plate 110 may be supported on the front side of the user's face by various components. In an exemplary embodiment, the support part 115 may be coupled to a part of the face plate 110 such that the face plate 110 is supported on the user's face. For example, the support part 115 may cause the face plate 110 to be closely contacted on the user's face around the eyes using a band formed of an elastic material that is in substantial contact with the back of the users head. In addition to or in place of the foregoing, the support part 115 may include eyeglass temples, a helmet, a strap, or the like.

The face plate 110 may have a shape or a configuration which allows the HMD apparatus 100 to be easily arranged and worn on the user's face. For example, the shape or the configuration of the face plate 110 may have an external appearance that covers the user's eyes. The shape or the configuration of the face plate 110 may include a nose recess so that the face plate 110 can be supported by the user's nose.

With continued reference to FIG. 1, the face plate 110 may be made of a material which may be easily worn by the user. The face plate 110 may support an electronic device 200 and may be made of a light material (e.g., a plastic) which allows the user to feel comfortable while wearing the HMD.

In addition, for example, the face plate 110 may be constituted with a material capable of protecting the HMD apparatus 100 from external impact. The material capable of protecting the HMD apparatus 100 may be, for example, at least one of a glass, a plastic (e.g., ABS or polycarbonate), a ceramic, a metal (e.g., aluminum), or a metal alloy (e.g., steel, stainless steel, titanium alloy or magnesium alloy).

The face plate 110 may also include a touch panel 111, one or more display position adjustment units 112A and 112B, and a lens adjustment unit 113.

The face plate 110 may include the touch panel 111, the display position adjustment units 112A and 112B, and the lens adjustment unit 113 on an external surface. The face plate 110 may include a space or a configuration to which the electronic device 200 may be coupled. The face plate 110 may further include a connector which may be coupled to and communicated with the electronic device 200.

According to an embodiment, one surface of the face plate 110 may be configured to include the space or the configuration to which the electronic device 200 may be coupled. For example, the one surface of the face plate 110 may include a cavity in the inside thereof so as to include the space or the configuration to which the electronic device 200 may be coupled. For example, the space or the configuration where the face plate 110 and the electronic device 200 may be coupled to each other may correspond to the external appearance of the electronic device 200. In an exemplary embodiment, the face plate 110 may have a deformable size such that the face plate 110 may be coupled with the electronic device 200 regardless of the size of the electronic device 200. The face plate 110 may be made of an elastic material or configured to be deformable in size to be coupled with the electronic device 200 regardless of the size of the electronic device 200. There are a number of ways that the electronic device 200 can be removably coupled to the face plate 110, such as latches, an elastomeric material, any type of fastener, etc.

According to an embodiment, the user may physically couple the electronic device 200 to the faceplate 110 by pushing the electronic device 200 into the cavity of the face plate 110 from the front side of the face plate 110. The electronic device 200 may be inserted into the cavity of the face plate 110 from the front side of the face plate 110. The face plate 110 may include a cover 119, (FIG. 3) which is capable of supporting the electronic device 200. When the electronic device 200 and the face plate 110 are coupled with each other, the cover may be removed and the electronic device 200 may be fitted to the cavity of the face plate 110. After the electronic device 200 and the face plate 110 are coupled with each other, the cover may be coupled to the face plate 110 again. In an exemplary embodiment, the HMD apparatus 100 may include a slot on at least one side surface of the face plate 110 so that the electronic device 200 can be inserted into the slots. The electronic device 200 may be coupled with the HMD apparatus 100 as being slid to the slots included on the lateral surfaces of the face plate 110. The electronic device 200 may be coupled to the face plate 110 such that the display of the electronic device 200 coupled to the face plate 110 is directed to the user.

One surface of the face plate 110 may have a structure curved in a user's face shape so that the user may wear the face plate 110. The one surface of the face plate 110 may include, for example, a nose recess. The face plate 110 may expose at least one surface of lenses to the outside of the face plate 110 so that the user may see a display device via the lenses. The one surface of the face plate 110 may include a soft material (e.g., sponge or rubber) so as to protect the user's face.

According to an exemplary embodiment, the face plate 110 may include a controller configured to control the electronic device 200 on a side surface thereof. The controller may include at least one of, for example, a touch panel 111, a joystick, a button, a wheel key, and a touch pad, and/or any combination thereof. The touch panel 111 may display a Graphical User Interface (GUI) capable of controlling the function of the electronic device 200. For example, the touch panel 111 may display a graphical user interface related to sound setting such that a volume of an audio output from the electronic device 200 may be adjusted. For example, the touch panel 111 may display a graphical user interface related to image reproduction such that an image displayed on the electronic device 200 may be controlled.

The touch panel 111 may receive a user's touch input (e.g., an input of directly touching the touch panel 111 or a hovering input). The HMD apparatus 100 may transmit the received touch input to the electronic device 200. The electronic device 200 may control a function corresponding to the touch input in response to the touch input received from the HMD apparatus 100. For example, the electronic device 200 may tune the volume or control the image reproduction in response to the received touch input.

According to an exemplary embodiment, the one or more display position adjustment units 112A and 112B and the lens adjustment unit 113 may be configured in a form of a wheel or a dial. The user may rotate the wheel or the dial implemented as the display position adjustment units 112A and 112B so as to adjust the position of the display, and may rotate the wheel or the dial implemented as the lens adjustment unit 113 so as to adjust a position between the lenses (e.g., a distance between the lenses). Of course, an artisan appreciates there are various ways to adjust position of the lenses for the HMD of the present disclosure besides rotating a wheel or dial. In addition, the one or more display position adjustment units 112A and 112B may be disposed at the top of left and right sides of the face plate 110. For example, the lens adjustment unit 113 may be disposed at the top of the center of the face plate 110. The positions where the position adjustment units 112A and 112B and the lens adjustment unit 113 are disposed may be variously adjusted in consideration of the characteristics of the HMD apparatus 100.

According to an embodiment, the user may adjust the distance between the electronic device 200 and the display by operating at least one of the display position adjustment units 112A and 112B to move the electronic device 200. When the user adjusts the position of the display of the electronic device 200 through at least one of the display position adjustment units 112A and 112B, the user may adjust the position of the electronic device 200 so as to view an image suitable for the user's eyesight.

In an embodiment, when the user simultaneously operates the display position adjustment units 112A and 112B, the HMD apparatus 100 may move the electronic device 200 toward or away from the user. In an exemplary embodiment, when the user simultaneously operates the display position adjustment units 112A and 112B, the HMD apparatus 100 may move the electronic device 200 toward or away from the lenses.

In an embodiment, when the user operates one of the one or more display position adjustment units 112A and 112B, the display position adjustment unit 112A or 112B which is not moved by the user may also be operated therewith. When the user operates one of the one or more display position adjustment units 112A and 112B, the HMD apparatus 100 may move the electronic device 200 toward or away from the user. In an exemplary embodiment, when the user operates one of the one or more display position adjustment units 112A and 112B, the HMD apparatus 100 may move the electronic device 200 toward or away from the lenses.

In an embodiment, when the user simultaneously rotates the one or more display position adjustment units 112A and 112B, the HMD apparatus 100 may move the electronic device 200 toward or away from the user. In an exemplary embodiment, when the user simultaneously rotates the one or more display position adjustment units 112A and 112B, the HMD apparatus 100 may move the electronic device 200 toward or away from the lenses.

In an exemplary embodiment, when the user rotates one of the at least one of the display position adjustment units 112A and 112B, the display position adjustment unit 112A or 112B which is not rotated by the user may also be rotated therewith. When the user rotates one of the one or more display position adjustment units 112A and 112B, the HMD apparatus 100 may move the electronic device 200 toward or away from the user. In an exemplary embodiment, when the user rotates one of the one or more display position adjustment units 112A and 112B, the HMD apparatus 100 may move the electronic device 200 toward or away from the lenses to assist with a user's focus.

The user may adjust the distance between the lenses by operating the lens adjustment unit 113. For example, when the distance between the user's eyes is short (in which is one non-limiting possible measurement criteria can be an inter-pupillary distance (PD), the user may operate the lens adjustment unit 113 to reduce the distance between the lenses so that the lenses may be positioned on both eyes. For example, when the distance between the user's eyes is relatively long compared to other users or a predetermined value, the user may operate the lens adjustment unit 113 to increase the distance between the lenses so that the lenses may be positioned on both eyes.

Figure 2:
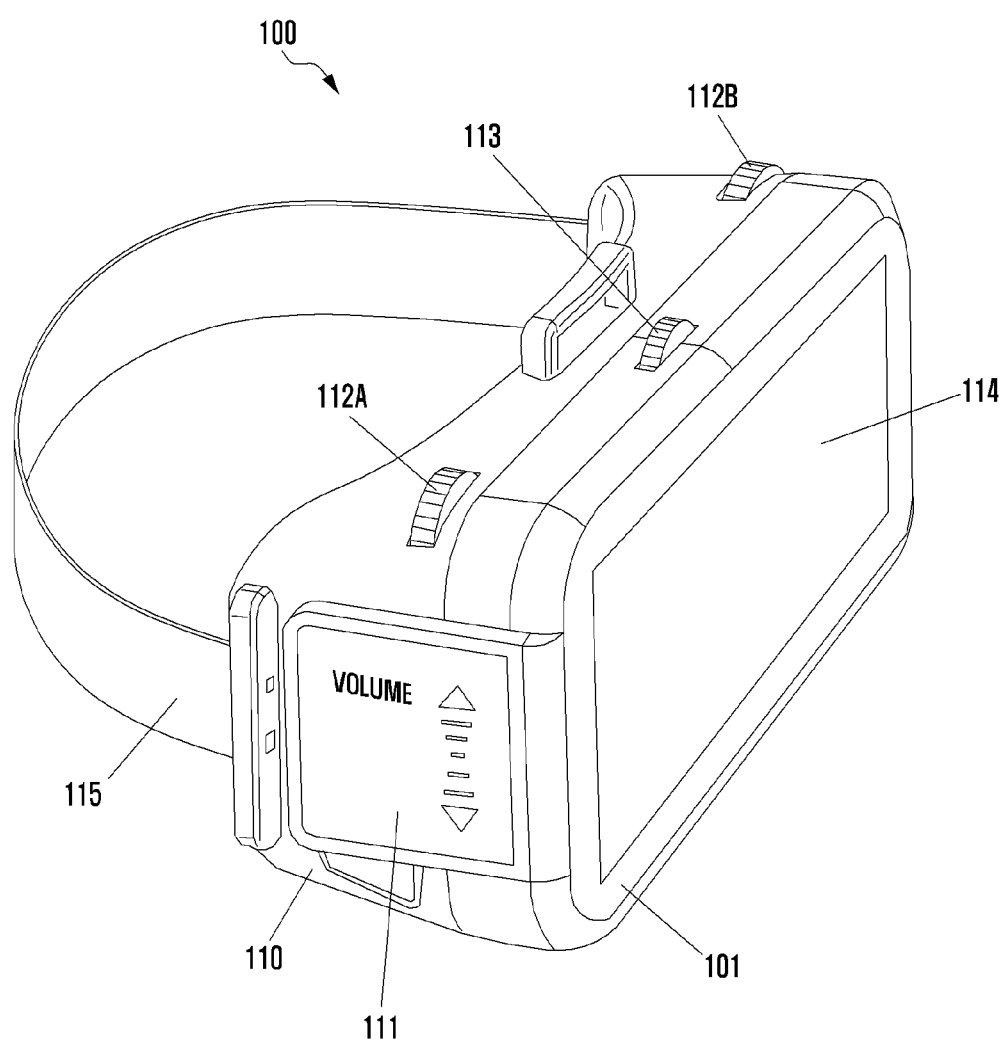
FIG. 2 is a perspective view illustrating an HMD apparatus according to various embodiments of the present disclosure.

FIG. 2 is a perspective view illustrating a HMD apparatus according to various exemplary embodiments of the present disclosure.

In FIG. 2, the HMD apparatus 100 may include a face plate 110 and a goggle band 115. The face plate 110 may be worn on a front side of the user's face. The face plate 110 may be supported on the front side of the user's face by various components. In an exemplary embodiment, the support part 115 may be coupled to a part of the face plate 110 so as to allow the face plate 110 to be supported on the user's face. The support part 115 is preferanly made of an elastic material to cause the face plate 110 to be in close contact with the user's face around the eyes. In addition to or in place of the foregoing, the support part 115 may include eyeglass temples, a helmet, a strap, or the like.

The face plate 110 may have a shape or a configuration which allows the HMD apparatus 100 to be easily worn by the user. For example, the shape or the configuration of the face plate 110 may have an external appearance that covers the user's eyes. The shape or the configuration of the face plate 110 may include a nose recess so that the face plate 110 can be supported by the user's nose.

The face plate 110 may be made of a material which may be easily worn by the user. The face plate 110 may support an electronic device 200 and may be made of a light material (e.g., a plastic) which allows the user to feel wearability. In an exemplary embodiment, the face plate 110 may be constituted with a material capable of protecting the HMD apparatus 100 from external impact. The material capable of protecting the HMD apparatus 100 may be at least one of a glass, a plastic (e.g., ABS or polycarbonate), a ceramic, a metal (e.g., aluminum), or a metal alloy (e.g., steel, stainless steel, titanium alloy or magnesium alloy), just to name some non-limiting possibilities.

The face plate 110 may include a touch panel 111, display position adjustment units 112A and 112B, a lens adjustment unit 113, and a display 114.

The face plate 110 may include the touch panel 111, the display position adjustment units 112A and 112B, the lens adjustment unit 113, and the display 114 on an external surface.

Figure 9:
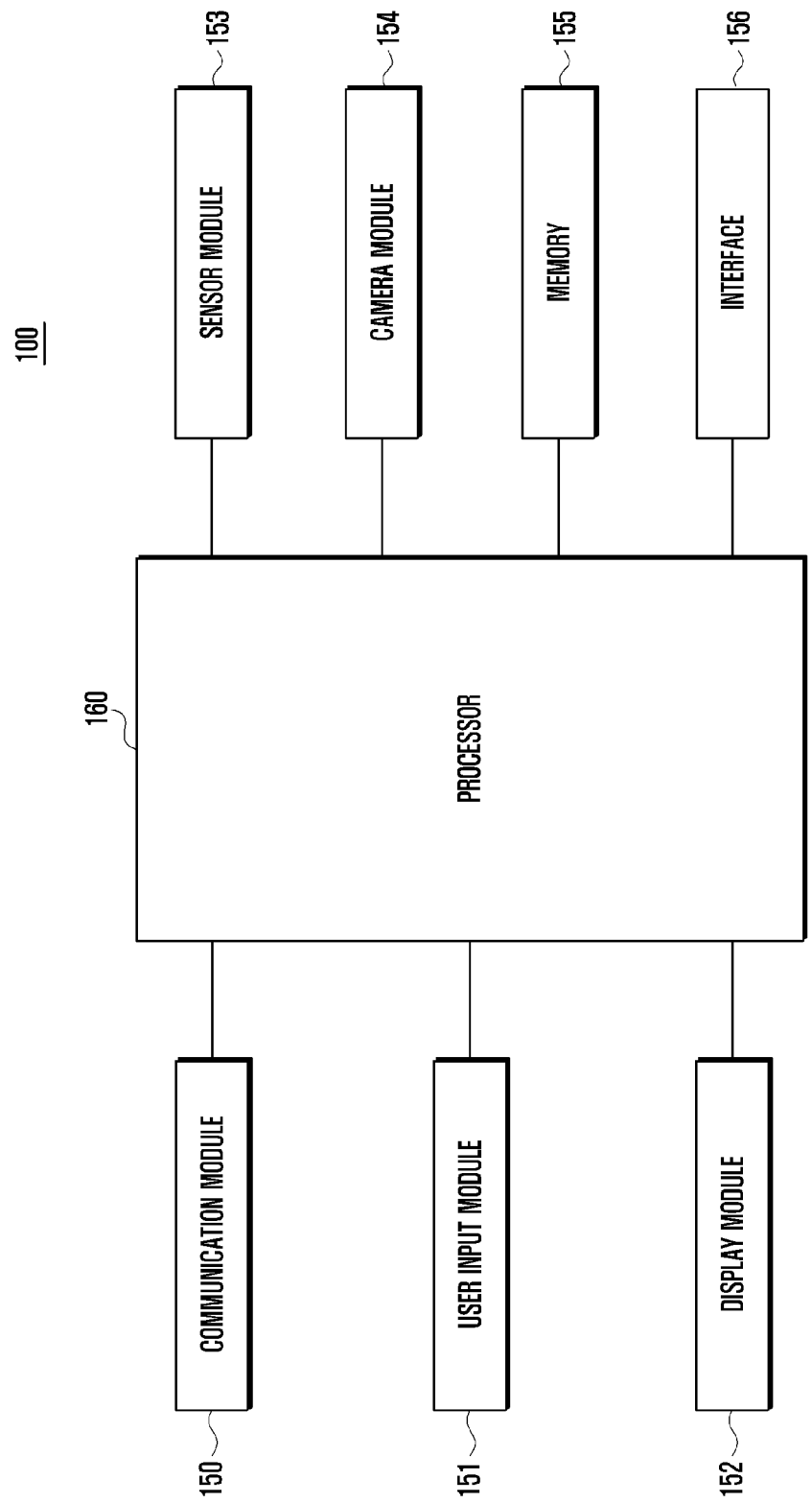
FIG. 9 is a block diagram illustrating a configuration of an HMD apparatus according to various embodiments of the present disclosure.

Referring now to FIG. 9, the face plate 110 may include therein, a communication module 150, a display module 152, a sensor module 153, a camera module 154, a memory 155, and an interface 156 that may control the functions of the electronic device 200 when they are connected to the electronic device 200a.

One surface of the face plate 110 may include the display 114. The display 114 may be moved in position by the user's operation. The display 114 may be disposed to face the user so that the user may view an image when wearing the HMD apparatus 100.

One surface of the face plate 110 may have a structure curved in a user's face shape so that the user may wear the face plate 110. The one surface of the face plate 110 may include a nose recess. The face plate 110 may expose at least one surface of the lenses to the outside of the face plate 110 so that the user may see a display device. The one surface of the face plate 110 may include a soft material (e.g., sponge or rubber) so as to protect the user's face, particularly as an elastic material is used for the goggle band (support part 115).

The face plate 110 may include a touch panel 111 on a side surface thereof. The touch panel 111 may display a Graphical User Interface (GUI) capable of controlling the function of the electronic device 200. For example, the touch panel 111 may display a graphical user interface related to sound setting such that a volume of an audio output from the electronic device 200 may be adjusted. For example, the touch panel 111 may display a graphical user interface related to image reproduction such that an image displayed on the electronic device 200 may be controlled. It is within the scope of the appended claims that more than one category of a graphical user interface can be displayed (e.g. sound and image reproduction). In an exemplary embodiment, the touch panel 111 may receive a user's touch event. The HMD apparatus 100 may control a function according to the received touch event. For example, the HMD apparatus 100 may he volume of the HMD apparatus 100 or control the image reproduction in response to the received touch event.

The face plate 110 may include one or more display position adjustment units 112A and 112B and a lens adjustment unit 113. The one or more display position adjustment units 112A and 112B and the lens adjustment unit 113 may take a form of a wheel or a dial for easier manipulation by a user. The one or more display position adjustment units 112A and 112B and the lens adjustment unit 113 may be configured in a form of a wheel or a dial and the user may rotate the wheel or the dial. The one or more display position adjustment units 112A and 112B may be disposed at the top of left and right sides of the face plate 110. Moreover, the lens adjustment unit 113 may be disposed at the top of the center of the face plate 110.

In an embodiment, when the user simultaneously operates the display position adjustment units 112A and 112B, the HMD apparatus 100 may move the display 114 toward or away from the user. In an exemplary embodiment, when the user simultaneously operates the display position adjustment units 112A and 112B, the HMD apparatus 100 may move the display 114 toward or away from the lenses.

In an embodiment, when the user operates only one of the one or more display position adjustment units 112A and 112B, the other display position adjustment unit 112A or 112B is not moved by the user. When the user operates only one of the one or more display position adjustment units 112A and 112B, the HMD apparatus 100 may move the display 114 toward or away from the user. In an embodiment, when the user operates only one of the one or more display position adjustment units 112A and 112B, the HMD apparatus 100 may move the display 114 toward or away from the lenses.

In an embodiment, when the user simultaneously rotates at least two of the one or more display position adjustment units 112A and 112B, the HMD apparatus 100 may move the display 114 toward or away from the user.

In an exemplary embodiment, when the user simultaneously rotates the one or more display position adjustment units 112A and 112B, the HMD apparatus 100 may move the display 114 toward or away from the lenses.

In an exemplary embodiment, when the user rotates one of the at least one of the display position adjustment units 112A and 112B, the other display position adjustment unit 112A or 112B, which is not rotated by the user may, can also be rotated therewith, for example, in a subsequent rotation. When the user rotates one of the one or more display position adjustment units 112A and 112B, the HMD apparatus 100 may move the electronic device 114 toward or away from the user. In an exemplary embodiment, when the user rotates one of the one or more display position adjustment units 112A and 112B, the HMD apparatus 100 may move the electronic device 114 toward or away from the lenses.

The user may adjust the position of the display 114 by operating the one or more display position adjustment units 112A and 112B to move the display 114. When the user adjusts the position of the display 114 by operating the one or more display position adjustment units 112A and 112B, the user may view an image output from the display 114 at a position suitable for the user's eyesight.

The user may adjust the distance between the lenses by operating the lens adjustment unit 113. For example, when the distance between the user's eyes is relatively short, the user may operate the lens adjustment unit 113 to reduce the distance between the lenses so that the lenses may be positioned on both eyes. For example, when the distance between the user's eyes is relatively long, the user may operate the lens adjustment unit 113 to increase the distance between the lenses so that the lenses may be positioned on both eyes.

Figure 3:
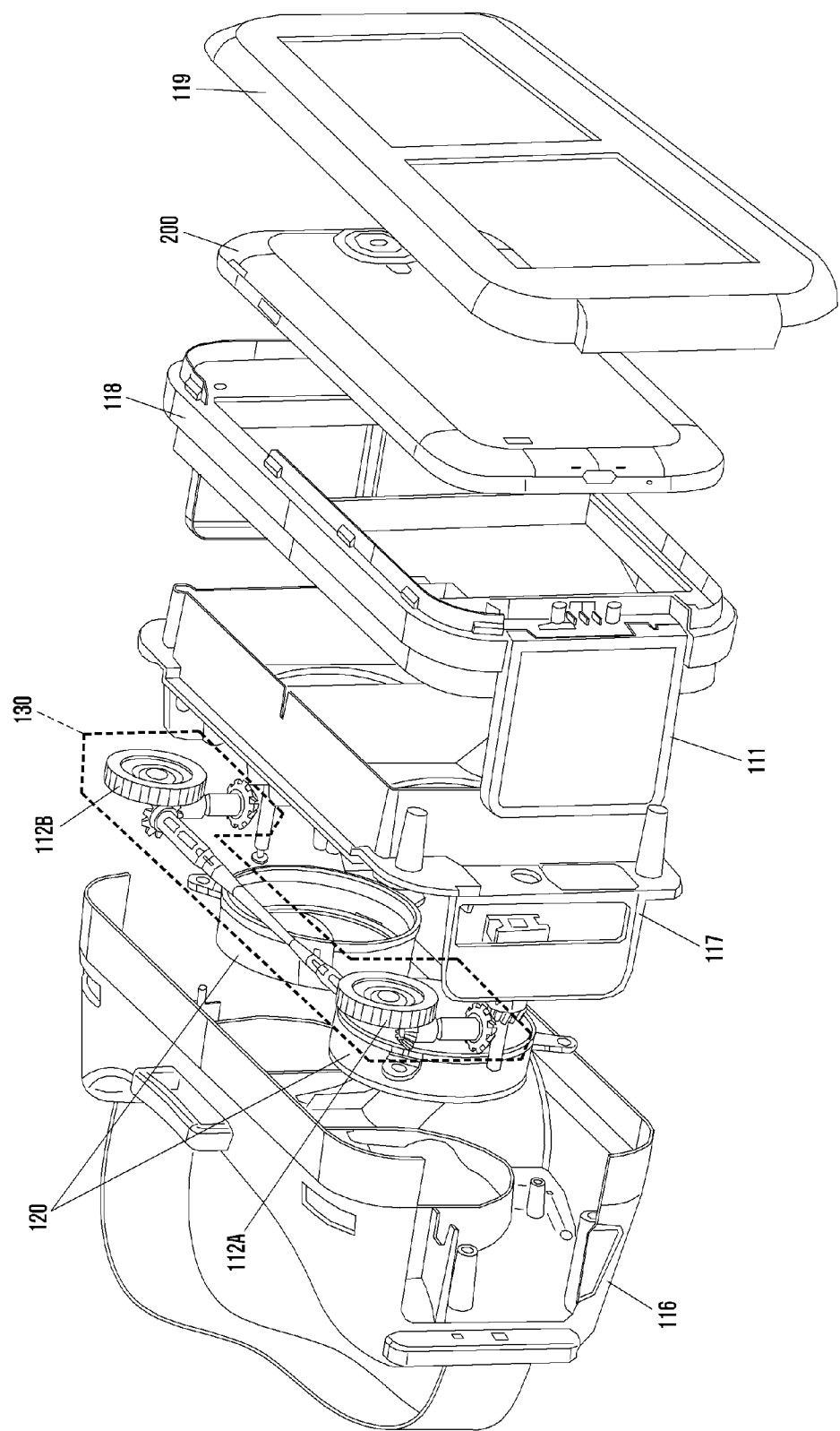
FIG. 3 is a view illustrating a configuration of an HMD apparatus according to various embodiments of the present disclosure.
Figure 12:
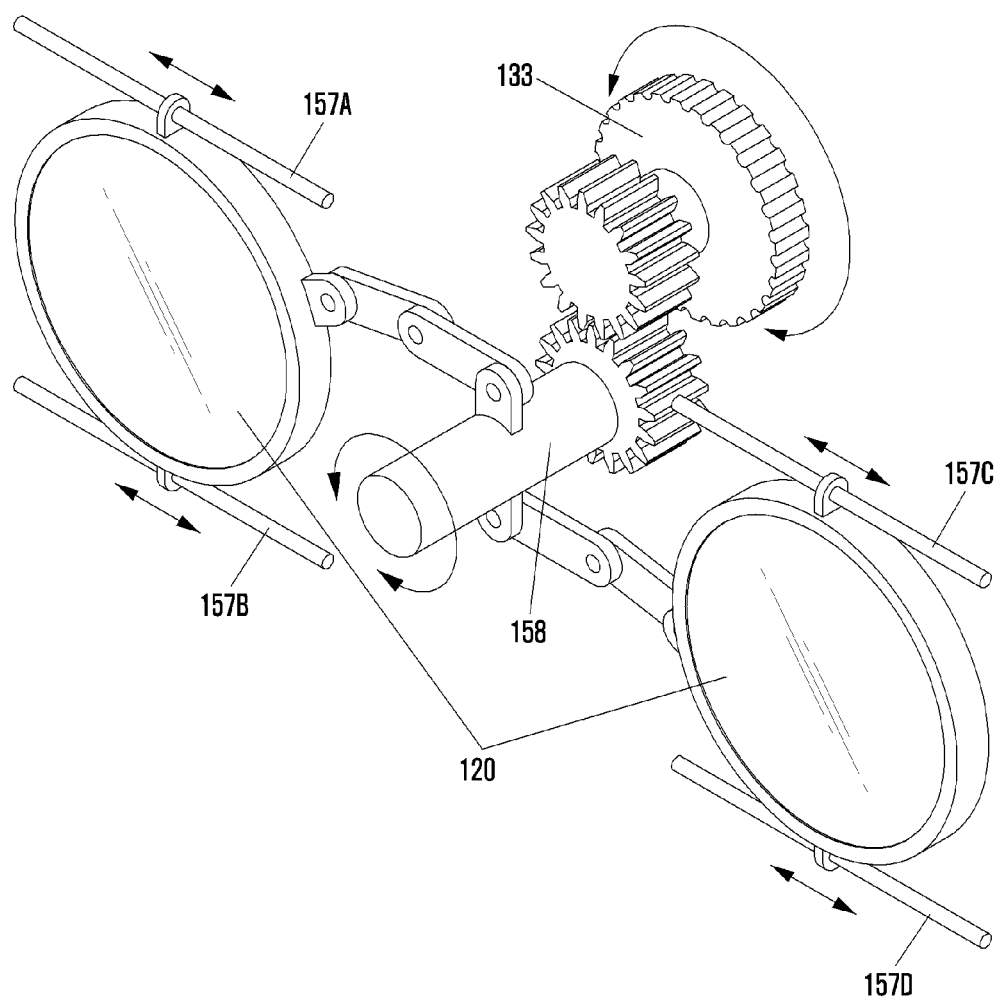
FIG. 12 is a view illustrating a lens module of an HMD apparatus, according to various embodiments of the present disclosure.

FIG. 3 is a view illustrating a configuration of a HMD apparatus 100 according to various exemplary embodiments of the present disclosure, and FIG. 12 is a view illustrating a lens module 120 of the HMD apparatus 100, according to various exemplary embodiments of the present disclosure.

Referring now to FIGS. 3 and 12, the HMD apparatus 100 may include a front case 116, a connection case 117, a movable case 118, a cover 119, a lens module 120, and a gear module 130. The face plate 110 may include a front case 116, a connection case 117, a movable case 118, a cover 119, a lens module 120, and a gear module 130.

According to an exemplary embodiment, one surface of the front case 116 (e.g. the surface directly facing the user's face) may have a configuration curved in a the general shape of a face so that the user may comfortably wear the front case 116. The one surface of the front case 116 may include a nose recess. The front case 116 may include the lens module 120 so that the user may view the display device by eyes. The front case 116 may include a soft member (e.g., sponge or rubber) for protecting the user's face. The front case 116 may be coupled with at least a part of the connection case 117. Upon being coupled with each other, the front case 116 and the connection case 117 may together form a space in which at least one of the lens module 120 and the gear module 130 may be mounted. For example, the front case 116 may fixedly support the lens module 120 and the gear module 130 together with the connection case 117. According to an embodiment, the front case 116 may be formed in a structure capable of at least partially exposing the lens surfaces included in the lens module 120 to the outside. For example, the front case 116 may include therein a space corresponding to the shapes of the lenses such that the lens module 120 may be fixed. Further, the front case 116 may also include therein a space such that the gear module 130 can be fixed therein.

According to an exemplary embodiment, a lens adjustment unit 113 may be further included in the space formed by coupling the front case 116 and the connection case 117. For example, the front case 116 may include a rail 157 capable of moving the lens module 120 (for the convenience of description, the rail may be referred to as a "lens moving rail") when the lens adjustment unit 113 is moved by operating the lens adjustment unit 113. At least one of the lenses included in the lens module 120 may move along the lens moving rail 157 back and forth. The moving distance of the at least one lens is determined depending on the length of the lens moving rail. According to an embodiment, two lenses may simultaneously move toward or away from each other.

For example, as shown in FIG. 12, the lens module 120 may include one or more lenses. Each of the lenses included in the lens module 120 may be connected with at least one of the lens moving rails 157A, 157B, 157C, and 157D at top and bottom ends thereof. The one or more lenses included in the lens module 120 are connected with a link part 158 therebetween. The link part 158 includes one or more joints. The link part 158 may wind or unwind joint parts according to the rotation of the lens adjustment unit 113 to move the one or more lenses included in the lens module 120. When the one or more lenses included in the lens module 120 are moved, each of the lenses may move along at least one of the lens moving rail 157A, 157B, 157C, and 157D which are positioned at top and bottom ends of the lenses, respectively.

In one arrangement, the connection case 117 may be positioned between the front case 116 and the movable case 118. For example, at least one part of the connection case 117 may be connected with the front case 116, and at least another part of the connection case 117 may be connected with the movable case 118. The connection case 117 may support at least one of the lens module 120 and the gear module 130 together with the front case 116. For example, the connection case 117 may include a lens-shaped space therein so that the lens module 120 can be fixed. The connection case 117 may include a space therein so that the gear module 130 can be fixed. When the one or more display position adjustment units 112A and 112B rotate, the connection case 117 moves together with the movable case 118 in order for the electronic device 200 or the display 114 may be positioned closer to the lens module 120 or further away from the lens module 120. The moving distance of the electronic device 200 or the display 114 may be determined by a length of one or more rail shafts 141A, 141B, 141C, and 141D of the gear module 130. An artisan understands and appreciates that the present claims are not limited the arrangement as provided for illustrative purposes and the order of some items may be different than the illustrative examples discussed herein.

According to an exemplary embodiment, the connection case 117 may take a configuration or shape, for example, of a lens barrel of a telescope or a microscope. When the connection case 117 has the configuration or shape of a lens barrel, it is possible to make light output from the electronic device 200 or the display 114 have a constant route (e.g., directed to the user or the lens module 120). When the connection case 117 has the configuration or shape of the lens barrel, external light may be blocked and only the light output from the electronic device 200 or the display 114 may be transmitted to the user.

According to an exemplary embodiment, the movable case 118 may be configured to have a space or a structure to which an external electronic device (e.g., the electronic device 200) may be coupled. For example, the shape of the space where the movable case 118 and the external electronic device are coupled to each other may correspond to the external shape of the external electronic device. In an exemplary embodiment, the size of the movable case 118 may be deformed such that the movable case 118 may be coupled with the electronic device 200 regardless of the size of the electronic device 200. For example, the movable case 118 may be made using an elastic material or structurally deformed to be coupled with the external electronic device regardless of the size of the external electronic device.

According to an exemplary embodiment, the external electronic device may be inserted into a cavity of the movable case 118 in front of the movable case 118.

In an exemplary embodiment, the HMD apparatus 100 may include slots on side surfaces of the movable case 118 into which the electronic device 200 may be inserted. The electronic device 200 may be coupled with the HMD apparatus 100 while being slid to the slots included in the movable cases 118. According to an embodiment, the movable case 118 may include a touch panel 111.

According to an exemplary embodiment, the movable case 118 may further include a dock or a connector to be connected with the electronic device 200 to be capable of being communicated with the electronic device 200. The dock or the connector included in the movable case 118 may include, for example, a communication interface (e.g., USB, HDMI, or D-SUB).

The cover 119 may fixedly support the electronic device 200 together with the movable case 118. When the electronic device 200 is coupled with the movable case 118, the cover 119 may be removed, and the electronic device 200 may be fitted to the cavity of the movable case 118. After the electronic device 200 and the movable case 118 are coupled with each other, the cover 119 may be re-coupled to the movable case 118. The display of the electronic device 200 coupled to the movable case 118 such that the display is directed toward the user. The cover 119 may have a structure or a shape that covers at least a part of the front surface of the movable case 118. In addition to or in place of the foregoing, the cover 119 may include a skeleton structure or shape. The cover 119 may be made of a transparent material such that the outside may be sensed through a camera included in the electronic device 200 while fixedly supporting the electronic device 200.

Figure 4:
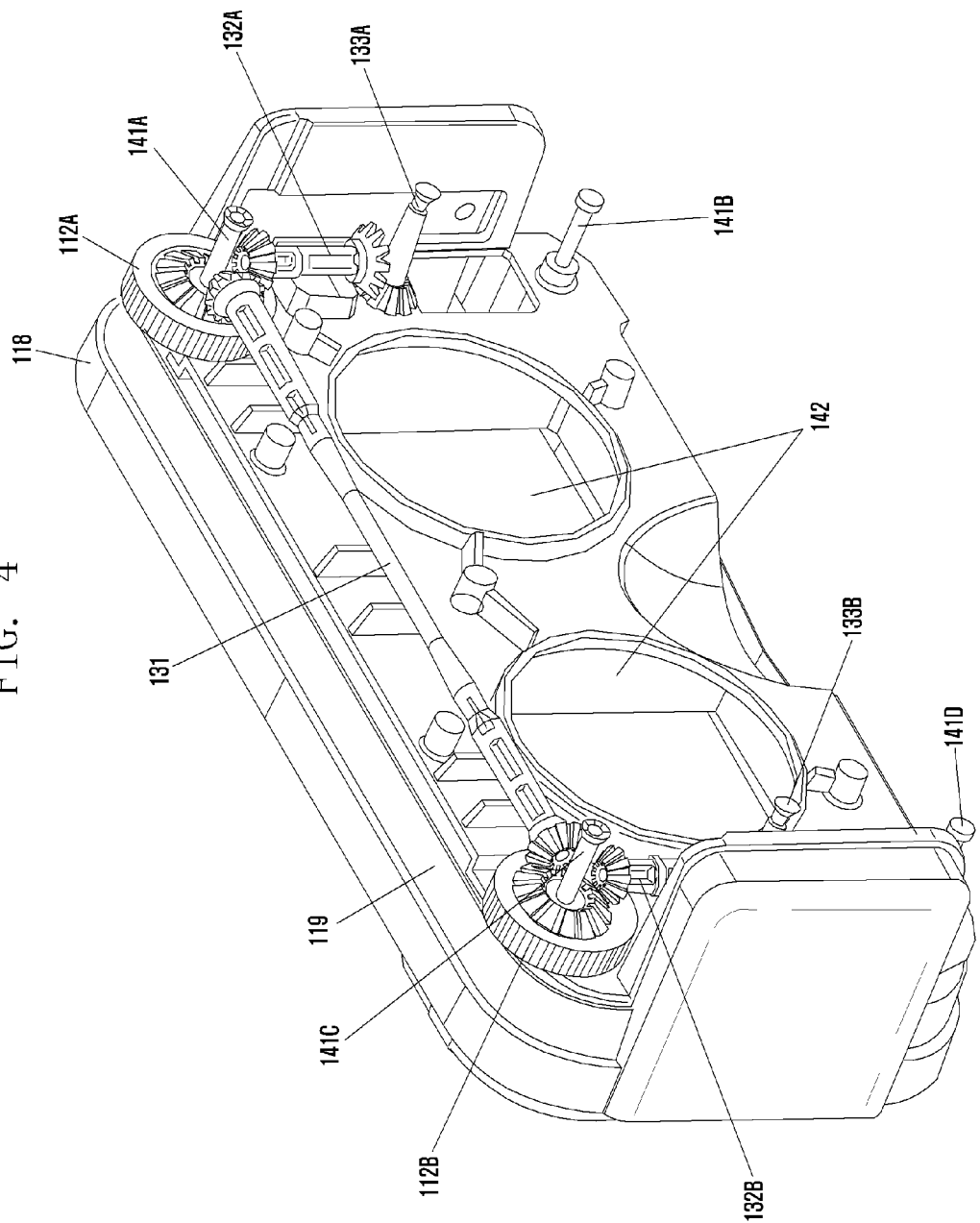
FIG. 4 is a view illustrating in detail a gear module according to various embodiments of the present disclosure.
Figure 5:
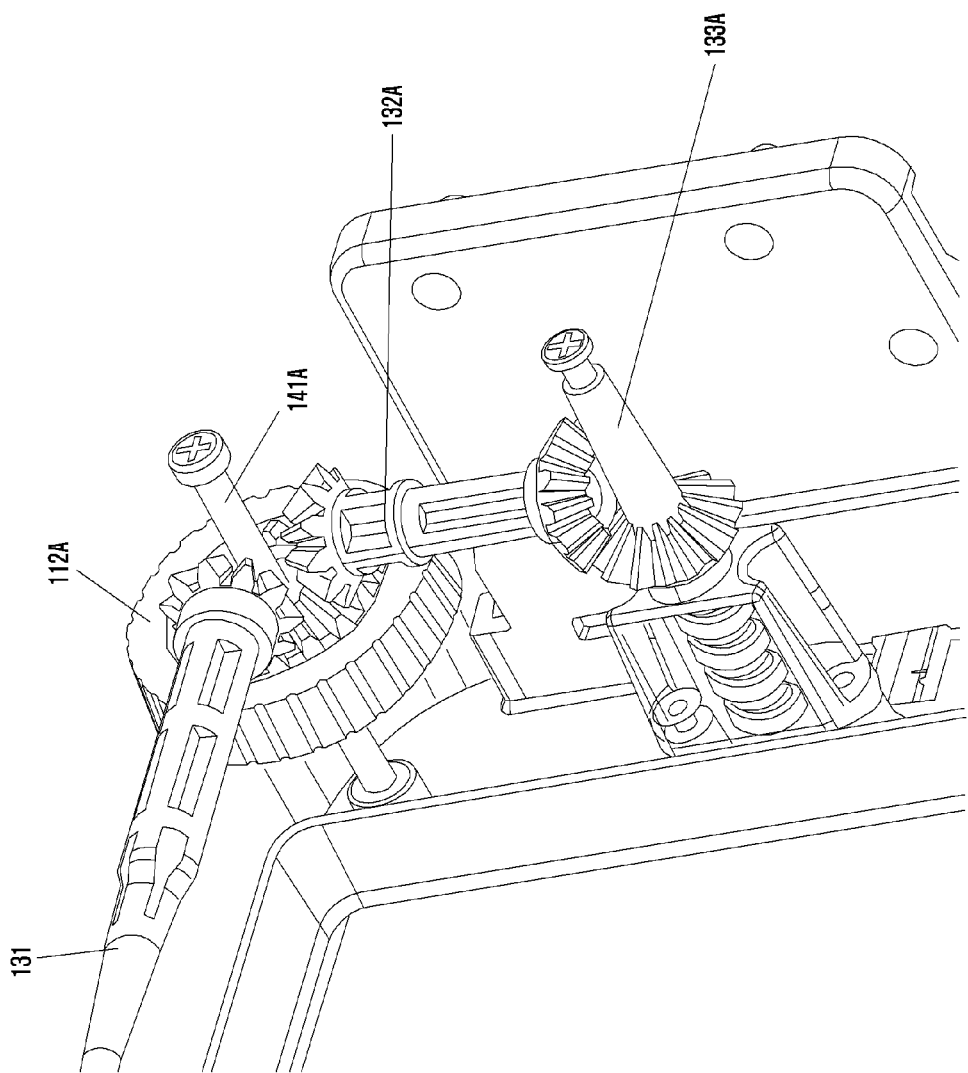
FIG. 5 is a view illustrating in detail at least a part of a gear module according to various embodiments of the present disclosure.
Figure 6:
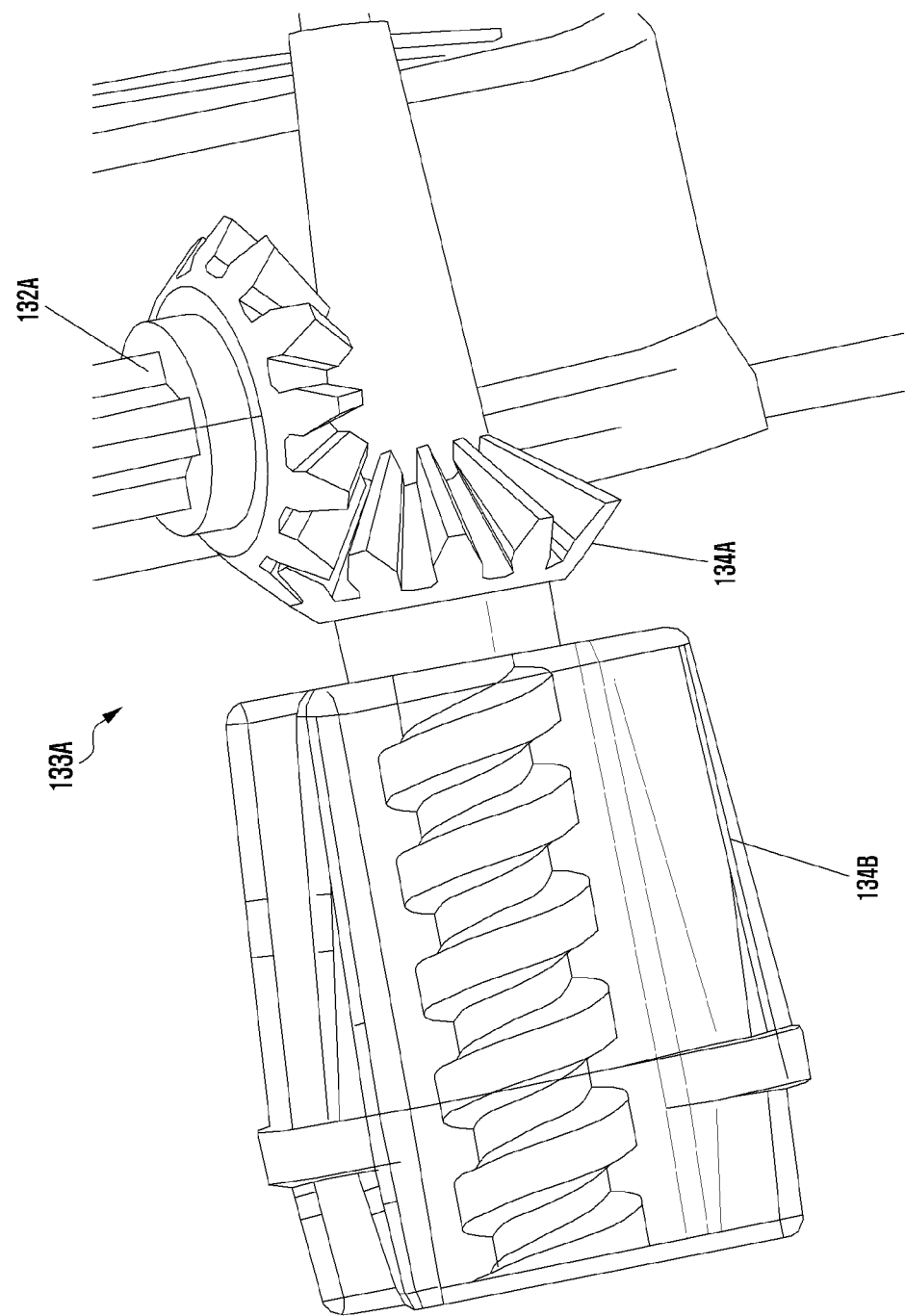
FIG. 6 is a view illustrating a moving gear according to various embodiments of the present disclosure.

FIG. 4 is a view illustrating a gear module 130 according to various embodiments of the present disclosure, FIG. 5 is a view illustrating in detail at least a part of the gear module 130 according to various embodiments of the present disclosure, and FIG. 6 is a view illustrating a moving gear 133A according to various embodiments of the present disclosure.

Referring now to FIGS. 4 to 6, according to an embodiment, the gear module 130 may be fixedly supported by the connection case 117. The connection case 117 may fix the gear module 130 together with the movable case 118.

The gear module 130 may include one or more display position adjustment units 112A and 112B, a horizontal bevel gear 131, one or more intermediate bevel gears 132A and 132B, one or more moving gears 133A and 133B, and one or more rail shafts 141A, 141B, 141C, and 141D. A bevel gear is a conical gear which is used when transmitting motion between two intersecting shafts.

For example, each of the display position adjustment units 112A and 112B includes a gear therein to transmit a rotation force to a horizontal bevel gear 131 and one or more intermediate bevel gears 132A and 132B when the user rotates at least one of the display position adjustment units 112A and 112B. The one or more display position adjustment units 112A and 112B may be disposed at the top of the left and right sides of the connection case 117.

When at least one of the display position adjustment units 112A and 112B is rotated, or the one or more display position adjustment units 112A and 112B are simultaneously rotated, the horizontal bevel gear 131 may transmit a force to both the display position adjustment units 112A and 112B. The horizontal bevel gear 131 may be disposed between the display position adjustment units 112A and 112B. For example, the horizontal bevel gear 131 may evenly transmit the force generated when at least one of the display position adjustment units 112A and 112B is rotated. The horizontal bevel gear 131 may be disposed at the upper end of the face plate 110.

With reference to FIG. 4, the intermediate bevel gears 132A and 132B may transmit the force transmitted from the display position adjustment units 112A and 112B to the moving gears 133A and 133B.

For example, each of the moving gears 133A and 133B may include a vertical bevel gear and a screw unit. Each of the moving gears 133A and 133B may receive the force transmitted from the one or more intermediate bevel gears 132A and 132B through a vertical bevel gear.

Referring now to FIG. 6, for example, the moving gear 133A may include a vertical bevel gear 134A and a screw unit 134B. The moving gear 133A may receive the force transmitted from the intermediate bevel gear 132A through the vertical bevel gear 134A. The moving gear 133A may transmit the force received through the vertical bevel gear to the screw unit 134B.

The screw unit 134B may include a female screw and a male screw. The male screw may be connected to the vertical bevel gear and moved according to the force transmitted from the intermediate bevel gear 132A. The male screw may be connected to the vertical bevel gear and perform a unscrewing/screwing operation with the female screw by the force transmitted from the intermediate bevel gear 132A to move the electronic device 200 or the display 114.

For example, the unscrewing direction of the male screw is directed toward the lenses or the user, and the screwing direction may be directed away from the lenses or the user. In another exemplary embodiment, the screwing direction of the male screw may be directed toward the lenses or the user and the unscrewing direction is directed away from the lenses or the user.

The one or more rail shafts 141A, 141B, 141C, and 141D may provide rotation on which the display position adjustment units 112A and 112B may rotate. The one or more rail shafts 141A, 141B, 141C, and 141D may guide a movable range where the electronic device 200 or the display 114 may be moved. The electronic device 200 or the display 114 may move along the one or more rail shafts 141A, 141B, 141C, and 141D.

According to an embodiment, the one or more rail shafts 141A, 141B, 141C, and 141D may be disposed at a top and a bottom, a left and right corners of the connection case 117. Some rail shafts (e.g., rail shafts 141A and 141B) of the rail shafts 141A, 141B, 141C, and 141D may become moving shafts on which the one or more display position adjustment units 112A and 112B may rotate. For example, the one or more rail shafts 141A, 141B, 141C, and 141D may be stoppers of a nail head shape so as to guide the movable range where the electronic device 200 or the display 114 may move.

Figure 7:
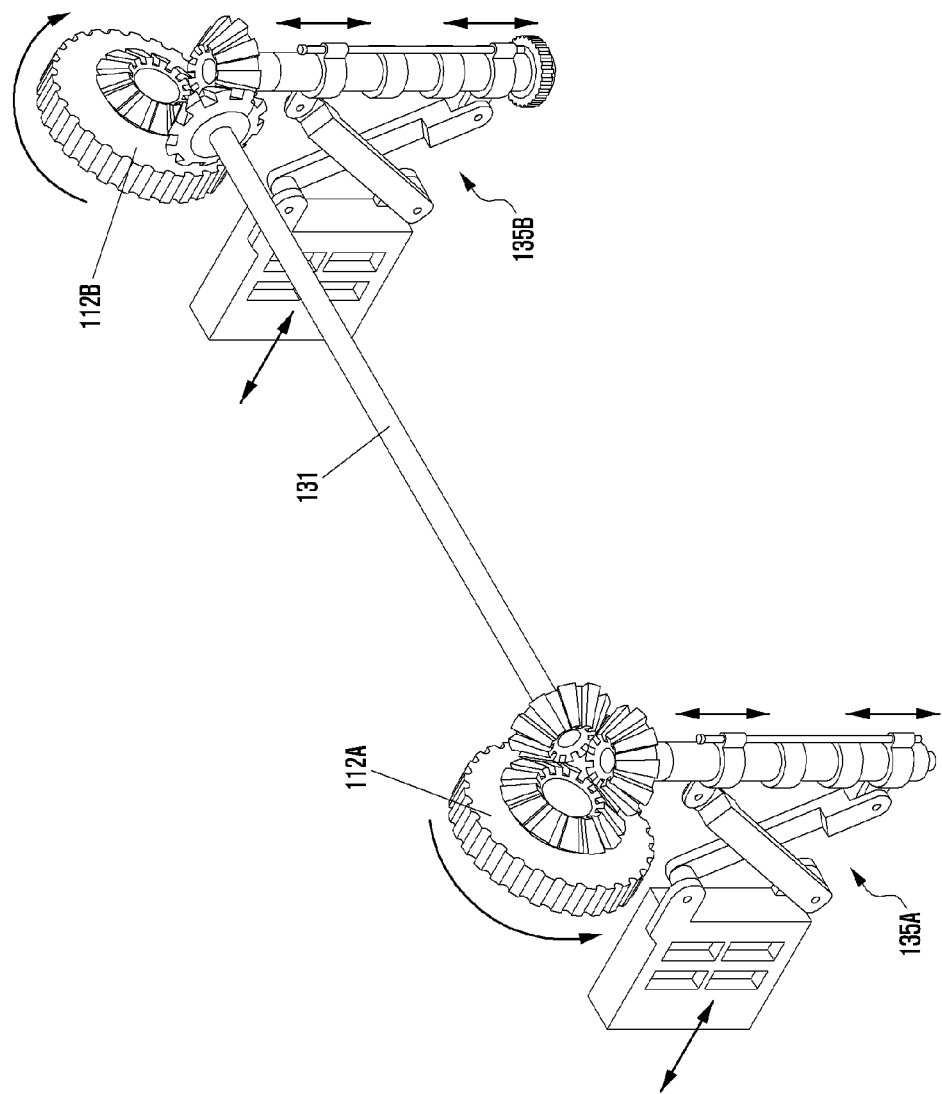
FIG. 7 is a view illustrating a gear module according to various embodiments of the present disclosure.

FIG. 7 is a view illustrating a part of a configuration (e.g., a gear module 130) of a HMD apparatus according to various embodiments of the present disclosure.

Referring now to FIG. 7, the gear module 130 may include the one or more display position adjustment units 112A and 112B, the horizontal bevel gear 131, and one or more link devices 135A and 135B. For example, the link devices may be configured to convert a rotating movement into a rectilinear movement.

The one or more display position adjustment units 112A and 112B are configured in a form or a wheel or a dial to facilitate user manipulation. When the user rotates the one or more display position adjustment unit 112A and 112B, the rotating force may be transmitted to the horizontal bevel gear 131 and the one or more link devices 135A and 135B.

The one or more link devices 135A and 135B may convert a rotation movement into a rectilinear movement according to the force transmitted from the one or more display position adjustment units 112A and 112B to move the electronic device 200 or the display 114.

Figure 8:
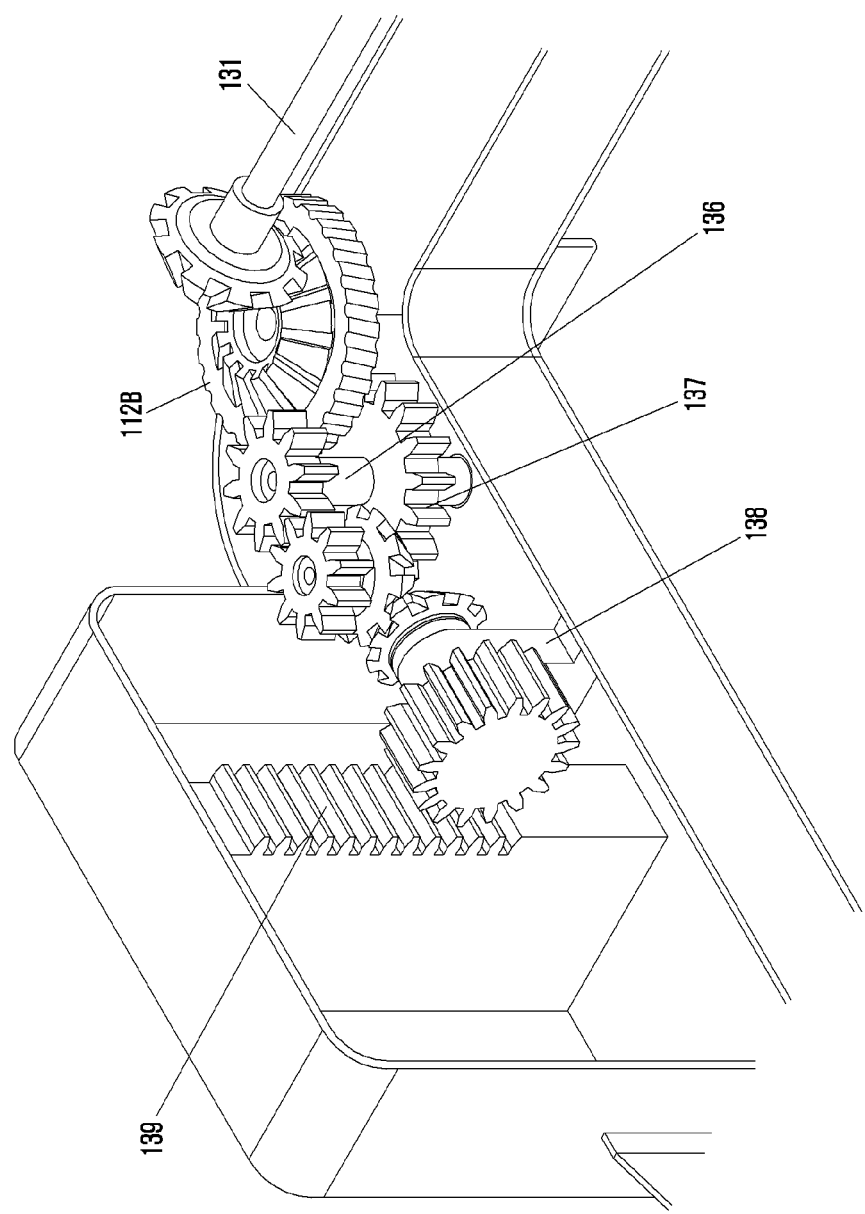
FIG. 8 is a view illustrating a gear module according to various embodiments of the present disclosure.

FIG. 8 is a view illustrating a gear module according to various embodiments of the present disclosure.

The gear module 130 may include a display position adjustment unit 112B, a horizontal bevel gear 131, a first vertical first vertical dual gear 136, a second vertical dual gear 137, a horizontal dual gear 138, and a spur gear 139.

The display position adjustment unit 112B may transmit a force received from the user to the horizontal bevel gear 131 and the first vertical dual gear 136. The horizontal bevel gear 131 may transmit a force transmitted from the display position adjustment unit 112B to another display position adjustment unit 112A. The first vertical dual gear 136 may transmit the force transmitted from the display position adjustment unit 112B to the second vertical dual gear 137. According to an exemplary embodiment, each of the first vertical dual gear 136, the second vertical dual gear 137, and the horizontal dual gear 138 may be configured such that two gears are rotated by one central shaft. For example, the second vertical dual gear 137 may transmit the force transmitted from the first vertical dual gear 136 to the horizontal dual gear 138. The horizontal dual gear 138 may transmit the force transmitted from the second vertical dual gear 137 to the spur gear 139. The spur gear 139 may be disposed in the connection case 117 to cause movement of the connection case 117.

FIG. 9 is a block diagram illustrating a configuration of a HMD apparatus 100 according to various embodiments of the present.

The HMD apparatus 100 may include a communication module 150, a user input module 151, a display module 152, a sensor module 153, a camera module 154, a memory 155, an interface 156, and a processor 160.

The communication module 150 may include an RF module or a wireless communication module, either of which include a transmitter, receiver and/or a transceiver. The RF module may perform data transmission/reception, and RF signal transmission/reception. The RF module may include, for example, a transceiver, a Power Amp Module (PAM), a frequency filter, or a Low Noise Amplifier (LNA).

For example, the wireless communication module may include WiFi, Bluetooth, GPS, or near field communication (NFC). For example, the wireless communication module may provide a wireless communication function using a wireless frequency. In addition to or in place of the foregoing, the communication module may include a network interface (e.g., a LAN card) or a modem to connect the HMD apparatus 100 to a network (e.g., Internet, a Local Area Network (LAN), a Wide Area Network (WAN), a telecommunication network, a cellular network, a satellite network, or a Plain Old Telephone Service (POTS).

The user input module 151 may also include a touch panel 111, a pen sensor, a key, or ultrasonic input device, just to name a few non-limiting possibilities. For example, the touch panel 111 may recognize a touch input by at least one of a capacitive touch type, a resistive touch type, an infrared type, and an ultrasonic type. In addition, the touch panel 111 may further include a control circuit. In the case of the capacitive touch type, a physical contact or proximity may be recognized. The touch panel 111 may further include a tactile layer. In such a case, the touch panel 111 may provide a response of tactual sense to the user. For example, a pen sensor may be implemented in a same or similar method of receiving a user's touch input or using a separate recognition sheet. For example, the key may include a physical button, an optical key, a keypad, or a touch key. An ultrasonic input device is a device configured to sense a micro sound wave through an input instrument that generates an ultrasonic wave signal to confirm data, and may perform wireless recognition. According to an exemplary embodiment, the HMD apparatus 100 may receive a user input from an external device (e.g., a network, a computer or a server) connected thereto via the communication module 150.

The display module 152 (e.g., the electronic device 200 including the display of FIG. 1 or the display 114 of FIG. 2) may include, for example, a panel, a hologram, or a projector. For example, the panel may be, for example, a Liquid Crystal Display (LCD) or an Active-Matrix Organic Light-Emitting Diode (AM-OLED). Moreover, the panel may be implemented to be flexible, transparent or wearable. The panel may be configured as a single module with the touch panel 111. The hologram may show a stereo-image using interference of light in the air. The projector may project light to a screen to display an image. For example, the screen may be positioned inside or outside the HMD apparatus 100. According to an exemplary embodiment, the display module 152 may further include a control circuit configured to control the panel, the hologram or the projector.

The sensor module 153 may measure a physical amount or sense the operating state of the HMD apparatus 100 and converts the measured or sensed information into an electric signal. For example, the sensor module 153 may include at least one of a gesture sensor, a gyro sensor, an air pressure sensor, a magnetic sensor, an acceleration sensor, a grip sensor, a proximity sensor, a color sensor (e.g., an RGB (red, green, blue) sensor), a bio-sensor, a temperature/moisture sensor, an illuminance sensor, and an ultraviolet (UV) sensor, just to name some non-limiting examples. In addition to or in place of the foregoing, the sensor module may include an E-nose sensor, an electromyography (EMG) sensor, an electroencephalogram (EEG) sensor, an electrocardiogram (ECG) sensor, an infrared (IR) sensor, an iris sensor, a fingerprint sensor, or the like. The sensor module 153 may further include a control circuit configured to control one or more sensors included therein.

The camera module 154 may photograph a still image and/or a moving image (a video image). According to an exemplary embodiment, the camera module 154 may include one or more image sensors (e.g., a front sensor or a rear sensor), a lens, an image signal processor (ISP), or a flash (e.g., an LED or a xenon lamp).

The memory 155, which may comprise a non-transitory memory may include an embedded memory or an external memory. For example, the embedded memory may include at least one of a volatile memory (e.g., a DRAM (Dynamic RAM), an SRAM (Static RAM), or an SDRAM (Synchronous Dynamic RAM)), and a non-volatile memory (e.g., an OTPROM (One Time Programmable ROM), a PROM (Programmable ROM), an EPROM (Erasable and Programmable ROM), an EEPROM (Electrically Erasable and Programmable ROM), a mask ROM, a flash ROM, a NAND flash memory, or a NOR flash memory). According to an embodiment of the present disclosure, the embedded memory may be a Solid State Drive (SSD). The external memory may further include a flash drive, for example, a CF (compact flash), an SD (secure digital), a Micro-SD (micro secure digital), a Mini-SD (mini secure digital), an xD (extreme digital) or a memory stick. The external memory may be functionally connected with the HMD apparatus 100 through various interfaces. According to an exemplary embodiment, the HMD apparatus 100 may further include a storage device (storage medium) such as a hard drive.

The memory 155 may store a command or data generated from the processor 160, the communication module 150, the user input module 151, and the display module 152. The memory 155 may include programming modules including but not limited to a kernel, a middleware, an API (application programming interface) or applications.

The kernel may control or manage system resources (e.g., the processor 160 or the memory 155) used for executing an operation or a function implemented in the programming modules other than the kernel (e.g., the middleware, the API or the applications).

The kernel may provide an interface that may access and control or manage respective components of the HMD apparatus 100 from the middleware, the API or from the applications.

The middleware may perform an intermediation role such that the API or the applications may communicate with the kernel so as to exchange data. In connection with task requests received from the applications, the middleware is configured to assign a priority of using the system resources (e.g., the processor 160 or the memory 155) of the HMD apparatus 100 to one or more applications in the applications to perform a control for the task requests (e.g., scheduling or load balancing).

The API is an interface configured to control the functions provided by the applications in the kernel or the middlewear. For example, the API may include at least one interface or a function (e.g., a command) for file control, window control, image processing, or character control.

The applications associated with the API may include, for example, an SMS/MMS application, an e-mail application, a calendar application, an alarm application, a health care application (e.g., an application configured to measure an exercise amount or a blood sugar level), or an environmental information application (e.g., an application configured to provide atmospheric pressure, moisture or temperature information). In addition to or in place of the foregoing, the application may include an application related to information exchange between the HMD apparatus 100 and the electronic device 200. For example, the application related to information exchange may include a notification relay application configured to relay specific information to the electronic device 200 or a device management application configured to manage the electronic device 200.

For example, the notification relay application may include a function of relaying notification information generated in the other applications of the HMD apparatus 100 (e.g., the SMS/MMS application, the e-mail application, the health care application, or the environmental information application) to the electronic device 200. In addition to or in place of the foregoing, the alarm relay application may receive notification information from the electronic device 200 and provide the notification information to the user. For example, a device management application may manage (e.g., install, delete or update) at least some of functions of the electronic device 200 which communicates with the HMD apparatus 100 (e.g., turn-on/turn-off of an external electronic device itself (or some components thereof) or control of brightness (resolution) of the display), or an application operated in the external electronic device or a service provided from the external electronic device (e.g., a call service or a message service).

The application may include an application designated according to a property of the electronic device 200 (e.g., a type of the electronic device). For example, when the electronic device 200 is an MP3 player, the applications may include an application related to music reproduction. Similarly, when the external electronic device is a mobile medical device, the application may include an application related to health care. According to an embodiment, the application may include, at least one of an application designated to the HMD apparatus 100 or an application received from the electronic device 200.

The interface 156 may include an HDMI (high-definition multimedia interface), a USB (universal serial bus), an optical communication terminal, or a D-sub (D-subminiature), just to name a few non-limiting possibilities. In addition to or in place of the foregoing, the interface 156 may include an MHL (mobile high-definition link), an SD (secure digital)/MMC (multi-media card), or an IrDA (infrared data association).

The processor 160, which in one aspect comprises hardware circuitry that may be configured with software and may be in the form of an integrated circuit, may include at least one AP (application processor) or at least one CP (communication processor).

The processor 160 in another aspect may drive an operating system or an application program so as to control a plurality of hardware or software components connected to the processor 160, and may perform processing and arithmetic operation of various data including multimedia media. For example, the processor 160 may be implemented with a SoC (System on Chip). According to an exemplary embodiment, the processor 160 may further include a GPU (graphic processing unit) (not illustrated).

The processor 160 may perform a function of managing data link in a communication between the HMD apparatus 100 and the electronic device 200 connected thereto by a network and by converting a communication protocol. According to an exemplary embodiment, the processor 160 may perform at least some of the multimedia control functions. For example, the processor 160 may perform discrimination and authentication of an electronic device within a communication network using a subscriber identification module (e.g., an SIM card). In addition, the processor 160, which executes operations may provide a service, such as voice communication, video communication, text message, or packet data), to the user.

The processor 160 may control data transmission/reception of the communication module 150. According to an exemplary embodiment, the processor 160 may load a command or data received from least one of a non-volatile memory or other components individually connected thereto and process the command or data. In addition, the processor 160 may store data received from or generated by at least one of the other components in the non-volatile memory.

The HMD apparatus 100 may include a processing device configured to support a mobile TV (e.g., a GPU). For example, the processing device configured to support a mobile TV may process multimedia data according to a standard, such as DMB (digital multimedia broadcasting), DVB (digital video broadcasting) or a media flow.

The HMD apparatus 100 may be connected with the electronic device 200 through the communication module 150 or the interface 156. The HMD apparatus 100 may display a graphical user interface (GUI) on the touch panel 111. The display of the electronic device 200 and the display 114 are main display devices of the HMD apparatus 100. The display of the electronic device 200 and the display 114 may display a content (e.g., a video image, a photograph, Internet, or a music album) and an application on the HMD apparatus 100. The display of the electronic device 200 and the display 114 may execute the content and the graphical user interface of the application on the HMD apparatus 100 in response to a user input signal. The HMD apparatus 100 may receive the user input signal through the touch panel 111, and perform an operation according to the received input signal under the control of the processor 160.

In addition, the electronic device 200 may be a device including a communication function and a display function. For example, the electronic device may include at least one ore more of a smart phone, a tablet Personal Computer (PC), a mobile phone, a video telephone, an e-book reader, a desktop PC, a laptop PC, a netbook computer, a Personal Digital Assistant (PDA), a Portable Multimedia Player (PMP), an MP3 player, a mobile medical appliance, a camera, a game machine, and a wearable device (e.g., a Head-Mounted-Device (HMD) such as electronic glasses, electronic clothing, an electronic bracelet, an electronic necklace, an electronic accessory, an electronic tattoo, and a smart watch, just to name some non-limiting possibilities).

Figure 10:
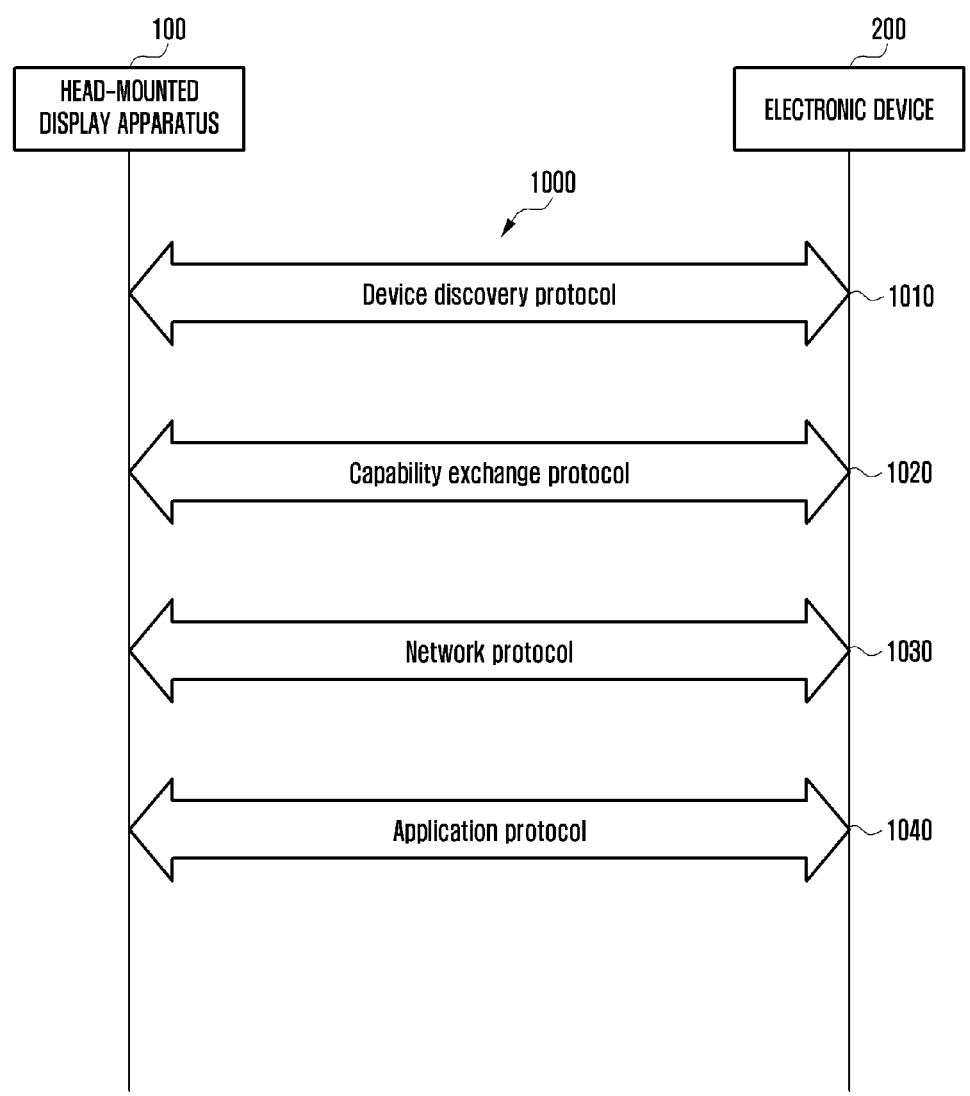
FIG. 10 is a view illustrating communication protocols between an HMD apparatus and an electronic device, according to various embodiments of the present disclosure.

FIG. 10 is a view illustrating communication protocols between a HMD apparatus and an electronic device, according to various exemplary embodiments of the present disclosure.

The communication protocol 1000 may include a device discovery protocol 1010, a capability exchange protocol 1020, a network protocol 1030, and an application protocol 1040.

According to an embodiment, the communication protocol 1000 may be a protocol that allows the HMD apparatus 100 and the electronic device 200 to sense an external electronic device, which may be communicated therewith, or to be connected with the sensed external electronic device. For example, the HMD apparatus 100 may sense an electronic device 200 which may be communicated therewith through a communication method to be used by the HMD apparatus 100 (e.g., WiFi, BT, or USB), by using the device discovery protocol 1010. The HMD apparatus 100 may acquire and store identification information for the electronic device 200 that is sensed using the device discovery protocol 1010, for the purpose of communication connection with the electronic device 200. For example, the HMD apparatus 100 may set up the communication connection with the electronic device 200 based on the identification information.

In an exemplary embodiment, the device discovery protocol 1010 may be a protocol for mutual authentication between a plurality of electronic devices. For example, the HMD apparatus 100 may execute authentication between the HMD apparatus 100 and the electronic device 200 based on communication information (e.g., a MAC (media access control) address, a UUID (universally unique identifier), a SSID (subsystem identification), or an IP (information provider) address).

According to an embodiment, the capability exchange protocol 1020 may be a protocol for exchanging information related to service functions to be capable of supporting at least one of the HMD apparatus 100 and the electronic device 200. For example, electronic devices 200 may exchange information related to the services currently provided by each of them through the capability exchange protocol 1020. The exchangeable information may include identification information that indicates a specific service among a plurality of services which may be supported by the HMD apparatus 100 or the electronic devices 200. For example, the HMD apparatus 100 may include identification information of a specific service provided by the electronic devices 200 from the HMD apparatus 100 through the capability exchange protocol 1020. In such a case, the HMD apparatus 100 may determine whether or not it is possible to support the specific service based on the received identification information.

According to an exemplary embodiment, the network protocol 1030 may be a protocol configured to control a flow of transmitted/received data in order for the electronic devices connected thereto to be capable of communicating, and may provide services in an interlocking manner therebetween. For example, the HMD apparatus 100 may perform, for example, an error control or a data quality control, using the network protocol 1030. In addition to or in place of the foregoing, the network protocol 1030 may determine a transmission format of data transmitted between the HMD apparatus 100 and the electronic devices 200. In addition, at least one of the HMD apparatus 100 and the electronic devices 200 may perform at least session management (e.g., session connection or session termination) for data exchange therebetween using the network protocol 1030.

According to another embodiment, the application protocol 1040 may be a protocol configured to provide a procedure or information for exchanging data related to the services supplied to the external electronic devices. For example, the HMD apparatus 100 may provide a service to the electronic devices 200 through the application protocol 1040.

According to yet another embodiment, the communication protocol 1000 may include a standard communication protocol, a communication protocol designated by an individual or a group (e.g., a communication protocol autonomously designated by a communication equipment manufacturing company or a network supply company) or a combination thereof.

The term "module" used in the present disclosure may refer to, for example, a unit including one or more combinations of hardware with software and firmware. The "module" may be interchangeable with a term, such as a unit, a logic, a logical block, a component, control unit, controller, or a circuit. The "module" may be a minimum unit of an integrated component element or a part thereof. The "module" may be a minimum unit for performing one or more functions or a part thereof. The "module" may be mechanically or electronically implemented.

Figure 11:
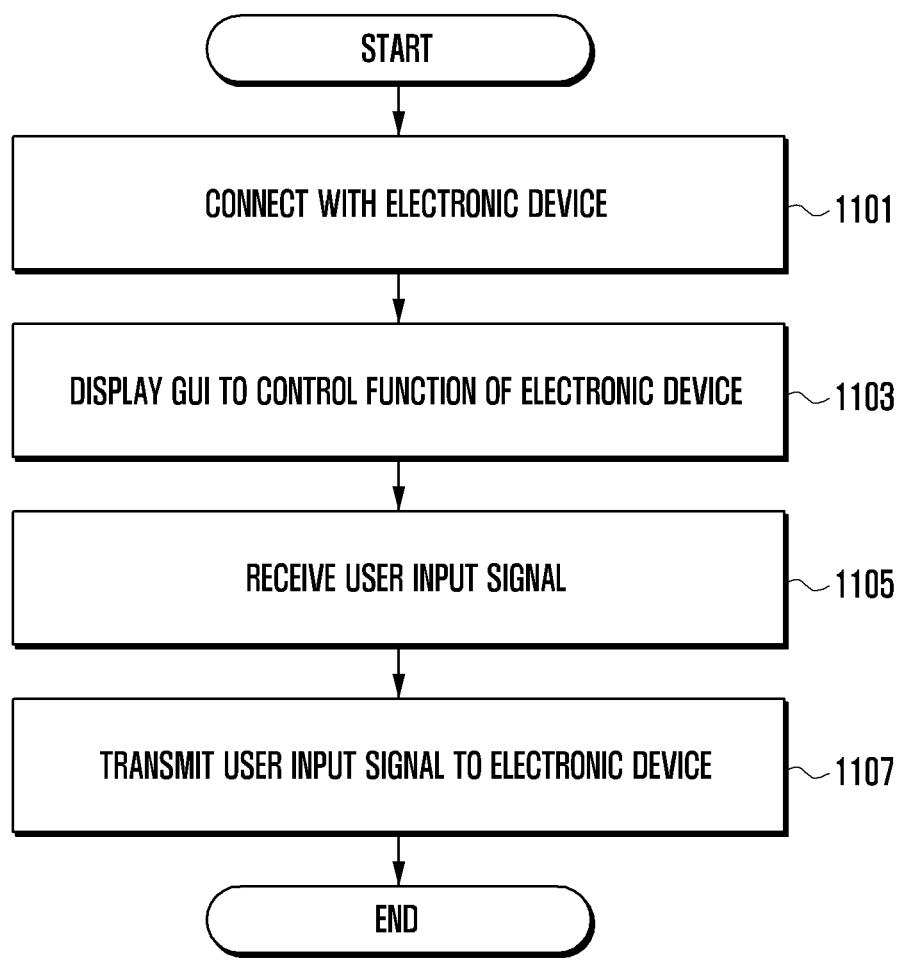
FIG. 11 is a flowchart illustrating a method of controlling an electronic device of an HMD, according to various embodiments of the present disclosure.

FIG. 11 is a flowchart illustrating one way performing operations of a method of controlling an electronic device 200 of a HMD apparatus 100, according to various embodiments of the present disclosure.

At operation 1101, an electronic device (e.g., the HMD apparatus 100) executes an external communication connection when an external electronic device (e.g., the electronic device 200) is coupled thereto. At operation 1103, the HMD apparatus 100 may display a graphical user interface (GUI) capable of controlling a function of the electronic device 200 on a touch panel 111. At operation 1105, the HMD apparatus 100 may receive a user input signal. In addition, at operation 1105, the HMD apparatus 100 may receive a touch input according to the user input signal. At operation 1107, the HMD apparatus 100 may transmit the received user input signal to the electronic device 200. In an exemplary embodiment, at operation 1107, the HMD apparatus 100 may transmit the signal capable of controlling the electronic device 200 according to the received user input signal to the electronic device 200.

The HMD apparatus 100 may further include a focus adjustment sensor unit (not illustrated) and a driving unit (not illustrated). The focus adjustment sensor unit (not illustrated) may be a CCD (Charge Coupled Device) image sensor or a CMOS (Complementary Metal-Oxide Semiconductor) image sensor.

A focus adjustment sensor unit (not illustrated) may be placed on the front case 116 so as to adjust the focus of the screen displayed on the external electronic device (e.g., the electronic device 200) or the display 114 at the user's eyes. The focus adjustment sensor unit (not illustrated) may sense a focus by sensing light output from the external electronic device (e.g., the electronic device 200) or the display 114 at the user's eye.

The HMD apparatus 100 may move the external electronic device (e.g., the electronic device 200) or the display 114 according to the sensed focus. The HMD apparatus 100 may move the external electronic device (e.g., the electronic device 200) or the display 114 according to the sensed focus using a driving unit (not illustrated) including a motor.

Figure 13:
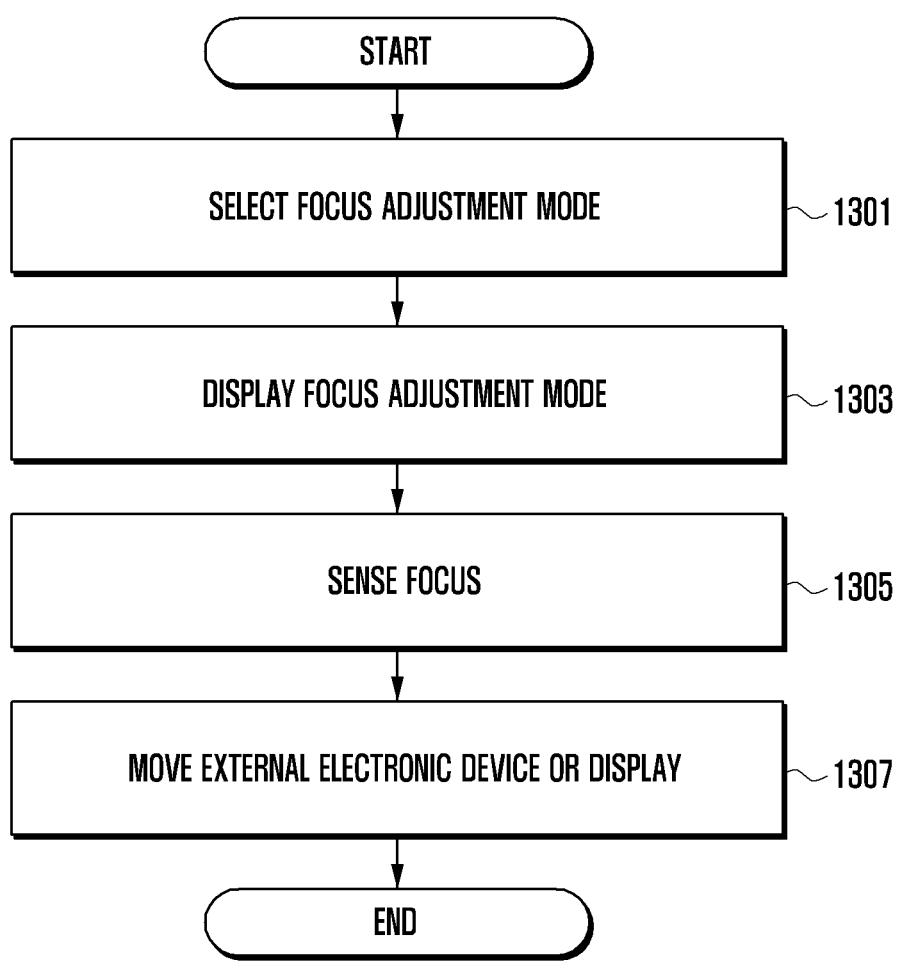
FIG. 13 is a flowchart illustrating a focus adjustment method of an HMD apparatus, according to various embodiments of the present disclosure.

FIG. 13 is a flowchart illustrating a focus adjustment method of a HMD apparatus 100, according to various exemplary embodiments of the present disclosure.

At operation 1301, the HMD apparatus 100 senses the user input signal through a user input module 151, and a focus adjustment mode may be selected according to the user input signal.

At operation 1303, the HMD apparatus 100 may display the focus adjustment mode. The focus adjustment mode may be displayed to the user using the user interface through the external electronic device (e.g., electronic device 200) or the display 114. For example, at operation 1303, when the focus adjustment mode is selected according to the user input signal, the HMD apparatus 100 may display the focus adjustment mode. At operation 1303, in the case of displaying the focus adjustment mode, the focus adjustment mode may be displayed not only when the HMD apparatus 100 may control the position adjustment units 112A and 112*b* by the driving unit (not illustrate) to move the external electronic device (e.g., the electronic device 200) or the display 114, but also when the position adjustment unit 112A and 112B is controlled by the user so as to move the external electronic device (e.g., the electronic device 200) or the display 114. For this purpose, a sensor (not illustrated) configured to sense the movement of the position adjustment units 112A, 112B may be provided on the position adjustment units 112A and 112B, and the focus adjustment state may be sensed using the sensor and displayed on the external electronic device (e.g., the electronic device 200) or the display 114.

At operation 1305, when the focus adjustment mode is selected according to the user input signal, the HMD apparatus 100 may sense the focus of the user's eyesight through the focus adjustment sensor unit (not illustrated).

At operation 1307, the HMD apparatus 100 may move the external electronic device (e.g., the electronic device 200) or the display 114 according to the display focus of the user's eyesight sensed through the focus adjustment sensor unit (not illustrated). The HMD apparatus 100 may control the one or more position adjustment units 112A and 112B) through the driving unit (not illustrated) to move the external electronic device (e.g., electronic device 200) or the display 114.

Figure 14:
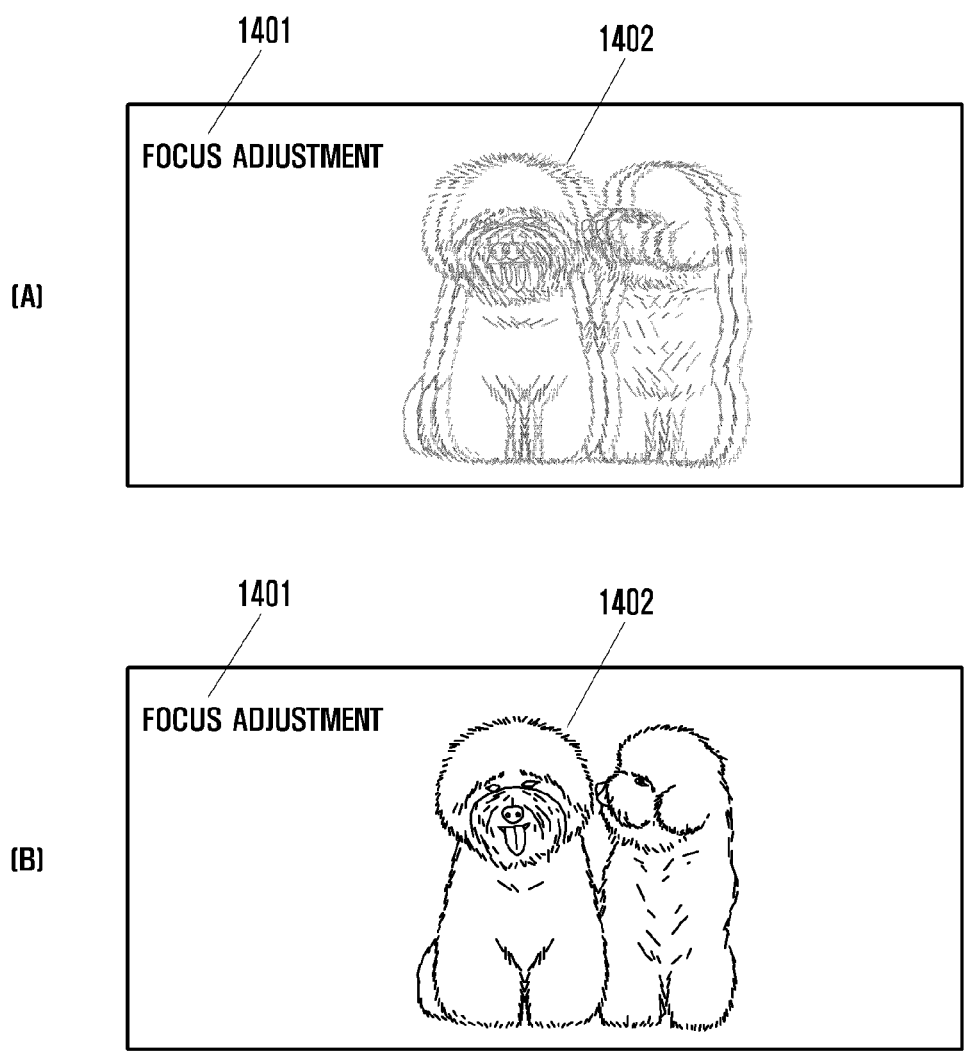
FIG. 14 is a view illustrating a focus adjustment method of an HMD apparatus, according to various exemplary embodiments of the present disclosure.

FIG. 14 is a view illustrating a focus adjustment method of a HMD apparatus 100, according to various embodiments of the present disclosure.

In Screen [A] of FIG. 14, when the position adjustment units 112A and 112B are moved as the focus adjust mode is selected and the position adjustment units 112A and 112B are moved by the user's operation, the HMD apparatus 100 senses the movement of the position adjustment units 112A and 112B through the sensor. When the movement of the position adjustment units 112A and 112B is sensed, an image for focus adjustment is displayed on the HMD apparatus 100. When the movement of the position adjustment units 112A and 112B is sensed, the focus adjustment state 1401 may be displayed. When the image 1402 output from the HMD apparatus 100 is out of the user's focus as in Screen [A], the image may be output in a defocused or blurred state. When the image 1402 output from the HMD apparatus 100 is in the user's focus as in Screen [B], the image may become clear. Through this, the user may adjust the eyesight focus.

Figure 15:
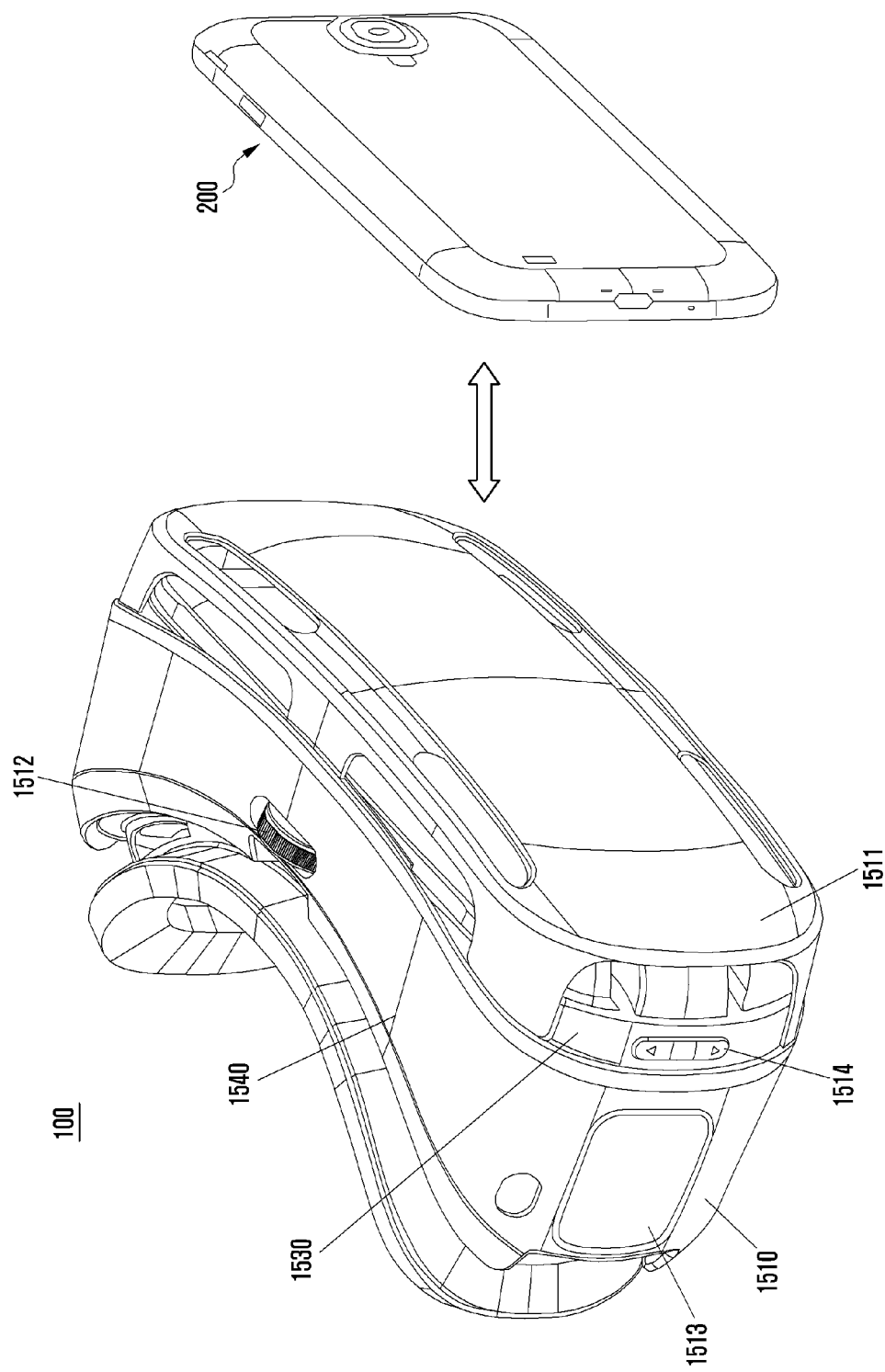
FIG. 15 is a perspective view illustrating an HMD apparatus according to various exemplary embodiments of the present disclosure.
Figure 16:
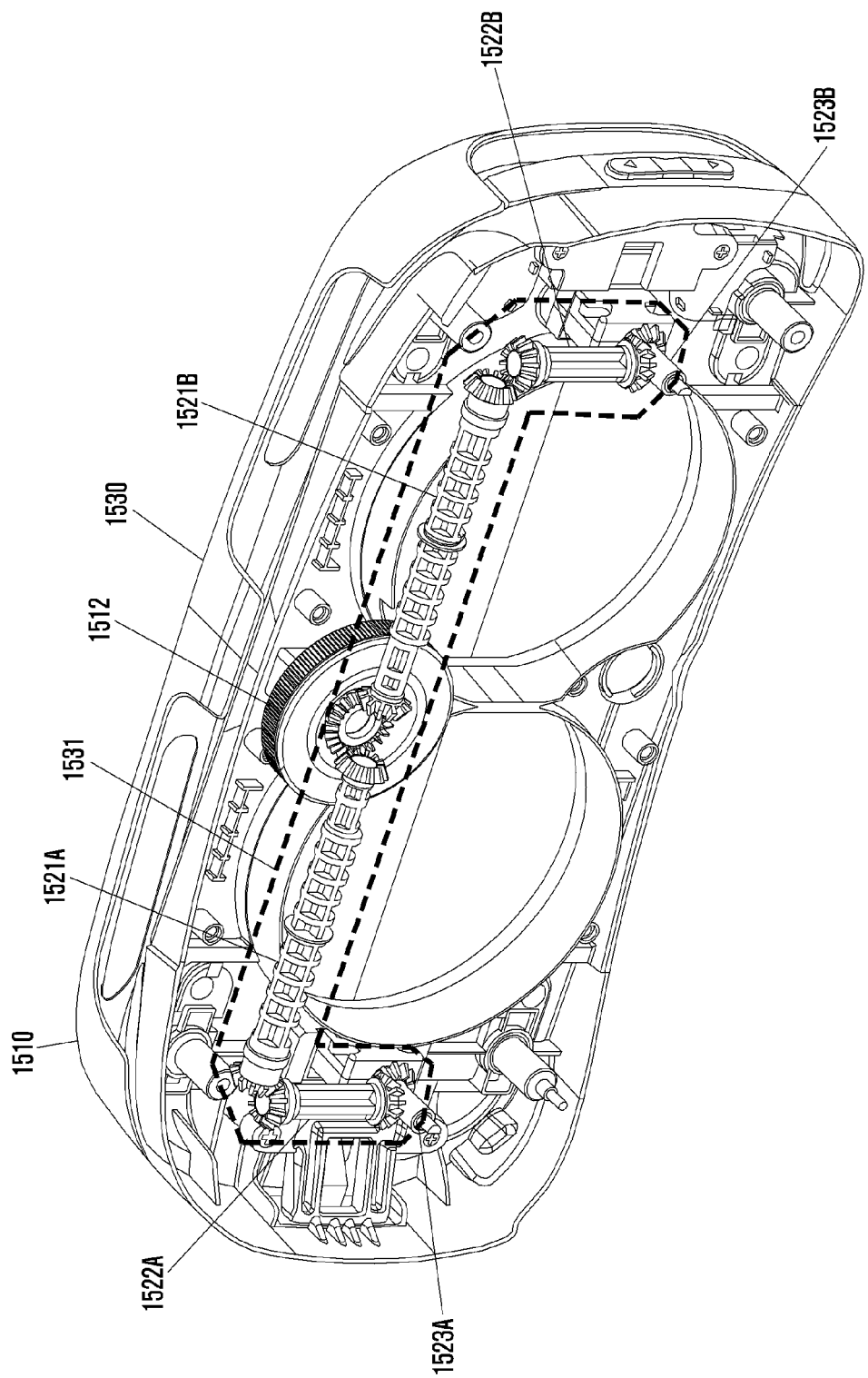
FIG. 16 is a view illustrating a configuration of the head-mounted display apparatus 100 of FIG. 15.

As shown in FIGS. 15 and 16, the head-mounted display apparatus 100 may include a face plate 1510, a cover 1511, a display position adjustment unit 1512, a touch pad 1513, or a physical key 1514. The face plate 1510 may be worn on at least a portion of a user's face. The face plate 1510 may be supported on a front of the user's face by various constituent elements. For example, the HMD apparatus 100 may further include a support part (not illustrated) coupled to a part of the face plate 1510 to allow the face plate 1510 to be supported on the user's face. The support part may allow the face plate 1510 to be in close contact around the user's eyes on the user's face using a band formed of an elastic material. Additionally or alternatively, the support part may be configured as, for example, eyeglass temples, a helmet, or a strap. The face plate 1510 is formed by a connection case 1530 and a front case 1540 so that a device required for the HMD apparatus 100, such as a sensor, or a gear or a motor required for moving the electronic device 200 may be mounted inside the face plate 1510.

The face plate 1510 may have a shape or structure that allows the HMD apparatus 100 to be easily worn on the user's face. For example, the shape or structure of the face plate 1510 may have an external shape that covers the user's eyes. The shape or structure of the face plate 1510 may include a nose recess to be supported by the user's nose.

The face plate 1510 may be made of a material which may be easily worn by the user. The face plate 1510 may support the electronic device 200 and be made of a light material (e.g., plastic) which allows the user to feel a convenient wearing sensation. In an exemplary embodiment, the face plate 1510 may be made of a material for protecting the HMD apparatus 100 from external impact. For example, the material for protecting the HMD apparatus 100 may be at least one of, for example, glass, plastic (e.g., ABS or polycarbonate), a ceramic, a metal (e.g., aluminum), and a metal alloy (e.g., steel, stainless steel, or a titanium or magnesium alloy).

The face plate 1510 may include a cover 1511, a display position adjustment unit 1512, touch pad 1513, and a physical key 1514 at outside thereof. The face plate 1510 may include a space or a structure to which the electronic device 200 may be coupled. The face plate 1510 may further include a connector to be coupled with the electronic device 200 and to perform communication.

The face plate 1510 may include a cover 1511 capable of supporting the electronic device 200. The user may push the electronic device 200 from the front surface of the face plate 1510 into a cavity of the face plate 1510. The electronic device 200 may be fitted into the cavity of the face plate 110 from the front surface of the face plate 110. When the electronic device 200 and the face plate 1510 are coupled to each other, the cover 1510 may be removed and the electronic device 200 may be fitted into the cavity of the face plate 1510. When the electronic device 200 and the face plate 1510 are coupled to each other, the cover 101 may be coupled to the face plate 1510 again.

The face plate 1510 may include a display position adjustment unit 1512. The display position adjustment unit 1512 may be positioned at the center of the upper end of the face plate 1510. For example, when the HMD apparatus 100 is viewed in front of it, the display position adjustment unit 1512 may has a shape in which a dial or a wheel is partially exposed upward and positioned at the center of the upper end of the face plate 1510.

The display position adjustment unit 1512 may be configured in a form of a wheel or a dial. The user may turn the display position adjustment unit 1512 implemented as the wheel or the dial so as to adjust the position of the display. The position where the display position adjustment unit 1512 is disposed may be variously adjusted in consideration of the characteristic of the HMD apparatus 100.

In an exemplary embodiment, the HMD apparatus 100 may be configured such that a distance between the electronic device 200 and the user's eyes by fixing a lens and moving the electronic device 200 supported on the HMD apparatus 100 through the display position adjustment unit 1512. The user may adjust the position of the electronic device 200 to enjoy an image suitable for the user's eyesight by adjusting the display position of the electronic device 200 through the display position adjustment unit 1512.

In an exemplary embodiment, when the user operates the display position adjustment unit 1512, the HMD apparatus 100 may move the electronic device 200 toward or away from the user's eyes.

According to an exemplary embodiment, the face plate 1510 may include a control device on a side surface to control the electronic device 200. The control device may include at least one of, for example, a touch pad 1513, a physical key 1514, a joystick, a button, a wheel key, and a touch panel. The touch pad 1513 may display a Graphical User Interface (GUI) that may control the function of the electronic device 200. For example, the touch pad 1513 may display a GUI related to setting a sound so that the volume of the audio output from the electronic device 200 can be adjusted. For example, the touch pad 1513 may display a GUI related to image reproduction so that an image displayed in the electronic device 200 can be controlled.

The touch pad 1513 may receive a user's touch input (e.g., an input executed by directly touching the touch pad 1513 or a hovering input). The HMD apparatus 100 may transmit the received touch input to the electronic device 200. In response to the touch input received from the HMD apparatus 100, the electronic device 200 may control a function corresponding to the touch input. In addition, the electronic device 200 may adjust the volume or control image reproduction in response to an input of the physical key 1514.

The HMD apparatus 100 may include a gear module 1531. The gear module 1531 is a device capable of moving the electronic device 200 by transferring a force received from the display position adjustment unit 1512, through gears.

According to an exemplary embodiment, the gear module 1531 may be included in the connection case 1530 to be supported. The connection case 1530 may include the gear module 1531 together with the front case 1540.

The gear module 1531 may include a display position adjustment unit 1512, one or more horizontal bevel gears 1521A and 1521B, one or more intermediate bevel gears 1522A and 1522B, and one or more moving gears 1532A and 1532B. The bevel gear refers to a conical gear used when transferring a movement between two axes which intersect each other.

For example, the display position adjustment unit 1512 may include therein one or more gears which may transfer a rotating force generated when the user rotates the display position adjustment unit 1521 to one or more horizontal bevel gears 1521A and 1521B and one or more intermediate bevel gears 1522A and 1522B. The display position adjustment unit 1512 may be disposed at the center of the upper end of the connection case 1530 or the front case 1540.

When the display position adjustment unit 1512 is rotated, a force may be transferred to the horizontal bevel gears 1521A and 1521B positioned to the left and right with reference to the display position adjustment unit 1521. For example, the one or more horizontal bevel gears 1521A and 1521B may evenly transfer the force generated when rotating the display position adjustment unit 1512 to both the left and right sides. The one or more horizontal bevel gears 1521A and 1521B may be positioned on the upper end of the face plate 1510. With reference to FIG. 16, the intermediate bevel gears 1532A and 1532B may transfer a force received from the one or more horizontal bevel gears 1521A and 1521B to moving gears 1523A and 1523B. The operations of the moving gears 1523A and 1523B may be the same as those in FIG. 6.

For example, each of the moving gears 1523A and 1523B may include a vertical bevel gear and a screw unit. Each of the moving gears 1523A and 1523B may transfer a force received from the one or more intermediate bevel gears 1522A and 1522B, through the horizontal bevel gears 1521A and 1521B.

The apparatuses and methods of the disclosure can be implemented in hardware, and in part as firmware or as software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor, controller, control unit or other programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" or "microcontroller" constitute hardware in the claimed disclosure that contain circuitry that is configured for operation with software or firmware, and may be construed as implicitly including Digital Signal Processor (DSP) hardware. Under the broadest reasonable interpretation, the appended claims constitute statutory subject matter in compliance with 35 U.S.C. §101.

The definition of the terms "unit" or "module" as referred to herein is to be understood as constituting hardware circuitry such as a processor or microprocessor configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and does not constitute software per se or pure software.

The embodiments disclosed in the present specifications and drawings were provided merely to readily describe and to help a thorough understanding of the present invention but not intended to limit the scope of the present invention. Therefore, it should be construed that all modifications or modified forms drawn by the technical idea of the present invention in addition to the embodiments disclosed herein are included in the scope of the appended claims.

What is claimed is:
1. A head-mounted display (HMD) apparatus comprising:
a face plate having a first surface; and
a support part configured to be coupled with at least a part of the face plate, wherein the face plate includes:
   a front case having, on the first surface, a curved structure;
   a connection case having a first lens and a second lens;
   one or more position adjustment units are formed on at least one side surface of the face plate and the one or more position adjustment units are configured to adjust a position of an external electronic device;
   a movable case coupled to the connection case and including therein a space or a structure to which the external electronic device is coupled, the movable case being configured to move in correspondence with movement of the external electronic device; and
   a gear module configured to move the external electronic device, the gear module being positioned between the front case and the connection case.

2. The HMD apparatus of claim 1, wherein the face plate further includes, on the at least one side surface of the face plate, a touch panel configured to display a graphical user interface (GUI) to operate a function of the external electronic device, and to receive an input signal from a user.

3. The HMD apparatus of claim 2, wherein the face plate further includes a lens adjustment unit configured to adjust a distance between the first lens and the second lens.

4. The HMD apparatus of claim 1, wherein the first surface of the face plate has a curved structure corresponding to a shape of a user's face to facilitate being worn by the user,
wherein a cavity structure is formed on a second surface of the face plate which is opposite to the first surface of the face plate so that an external electronic device is mounted on the second surface of the face plate and within the cavity structure, and the second surface of the face plate includes a structure configured to mount the external electronic device therein.

5. The HMD apparatus of claim 1, wherein the first lens and the second lens are positioned between the front case and the connection case and are configured to transmit light, which are output from the external electronic device and transmitted through the connection case, to a user.

6. The HMD apparatus of claim 1, wherein the face plate is configured to be coupled with the external electronic device regardless of a size of the external electronic device.

7. The HMD apparatus of claim 1, further comprising, a cover arranged on the face plate and coupled with the movable case to support the external electronic device.

8. The HMD apparatus of claim 1, wherein the gear module comprises:
a horizontal bevel gear connected with the one or more position adjustment units, and the bevel gear configured to transmit a force received to the one or more position adjustment units positioned left and right;
one or more intermediate bevel gears being connected with the one or more position adjustment units and configured to transmit a force in a vertical direction in relation to a frame; and
one or more moving gears configured to transmit the movable case and the external electronic device with the force transmitted from the one or more intermediate bevel gears.

9. The HMD apparatus of claim 8, wherein the one or more moving gears are configured to move the external electronic device toward or away from a user's face.

10. The HMD apparatus of claim 8, further comprising one or more rail shafts on which the one or more position adjustment units rotate, and the one or more rail shafts being configured to fixedly support the one or more position adjustment units to the frame and provide a movable range of the external electronic device while coupled to the HMD.

11. The HMD apparatus of claim 8, wherein the one or more position adjustment units include a gear configured to transmit the force received to the horizontal bevel gear and to the one or more intermediate bevel gears.

12. The HMD apparatus of claim 1, wherein the gear module includes:
a horizontal bevel gear connected with the one or more position adjustment units, and configured to transmit a force received to the one or more position adjustment units positioned left and right; and
a link device connected with the one or more position adjustment units, the link device being configured to convert a rotational movement to a rectilinear movement according to the force transmitted from the one or more position adjustment units to move the external electronic device.

13. The HMD apparatus of claim 1, wherein the gear module includes:
a horizontal bevel gear connected with the one or more position adjustment units, and configured to transmit a force received to the one or more position adjustment units positioned left and right of the horizontal bevel gear;
one or more vertical dual gears configured to transmit a force transmitted from the one or more position adjustment units;
a horizontal dual gear configured to transmit the force transmitted from the one or more vertical dual gears; and
a spur gear configured to move the movable case and the external electronic device with the force transmitted from the horizontal dual gear.

14. The HMD apparatus of claim 1, wherein the face plate includes:
a non-transitory memory;
a communication module;
a user input module configured to receive a user input signal; and
a processor,
wherein when the processor is coupled with the external electronic device, the processor is configured to control the communication module to perform communication connection, control a graphical user interface (GUI) configured to control a function of the external electronic device to be displayed on the user input module, and control the communication module to transmit the user input signal to the external electronic device or to transmit a signal based on the user input signal for controlling the external electronic device.

15. The HMD apparatus of claim 14, wherein when a focus adjustment mode is selected according to the user input signal, the processor is configured to perform a control operation in which a focus adjustment mode is displayed on the external electronic device.

16. The HMD apparatus of claim 1, wherein the face plate includes a nose recess on the first surface.

17. The HMD apparatus of claim 1, wherein the support part is configured to be coupled with at least a part of the face plate to arrange the face plate on a user's face, and comprises one of a goggle band, eyeglass temples, a helmet, and a strap.

18. The HMD apparatus of claim 1, wherein a horizontal bevel gear is positioned at a top end of the face plate.

19. A Head Mounted Device (HMD) apparatus comprising,
a detachable case that is attached to a front side of a mobile electronic device that includes a top side, a bottom side, a first side, a second side, a back side, and a front side with an opening;
an elastic band that is connected to a portion of the first side and a portion of the second side of the case;
a first lens and a second lens that is positioned inside the opening of the case;
a cover that is connected to a portion of the HMD to cover at least a portion of the mobile electronic device attached to the case;
a position adjustment unit that is positioned on the top side of the case and adjusts a distance between the first and second lenses and a display of the mobile electronic device attached to the case; and at least one gear assembly that is connected to the position adjustment unit and can move the mobile electronic device attached to the case based on an operation of the position adjustment unit, wherein the case comprises, a movable case that includes a space or structure that can attach the mobile electronic device and can move with the mobile electronic device, and wherein the gear assembly comprises, a first gear that is connected to the position adjustment unit and rotates based on the operation of the position adjustment unit;

a second gear that is connected to the first gear and rotates based on a rotation of the first gear; and a third gear that is connected to the second gear and rotates based on a rotation of the second gear to move the mobile electronic device attached to the case.

20. The HMD apparatus of claim 19, further includes a lens adjustment unit configured to adjust a distance between the first lens and the second lens.

21. The HMD apparatus of claim 19, wherein the third gear comprises:

a screw unit include a female screw and a male screw; and a bevel gear connected to the second gear, and moves the mobile electronic device attached to the case by rotating the male screw according to the operation of the position adjustment unit.

22. The HMD apparatus of claim 19, wherein the case further comprises:

a face case that is formed at least a portion of the back, and has a curved structure; and a connection case for accommodating the first lens and the second lens, and coupled with the movable case and the face case.

23. The HMD apparatus of claim 19, wherein the position adjustment unit comprises:

a wheel or dial, and at least a portion of the wheel or dial is exposed to outside of the case.

24. The HMD apparatus of claim 19, wherein the case comprise a detachable structure:

wherein the detachable structure is configured to be coupled with the mobile electronic device regardless of a size of an external electronic device.

25. The HMD apparatus of claim 19, further comprises:

an interface electrically connected to the mobile electronic device.

26. The HMD apparatus of claim 19, further comprises:

when the HMD is to be worn on the user, a contact structure is formed to correspond to a shape of around an eye of a user.

27. The HMD apparatus of claim 26, wherein at least a portion of a contact structure includes an elastic material.

28. The HMD apparatus of claim 19, wherein at least one of the first gear, the second gear or the position adjustment unit comprises a bevel gear.

* * * * *